(12) United States Patent
Lin

(10) Patent No.: US 11,089,591 B2
(45) Date of Patent: Aug. 10, 2021

(54) METHOD AND APPARATUS FOR SLOT FORMAT DETERMINATION IN A WIRELESS COMMUNICATION SYSTEM

(71) Applicant: ASUSTek Computer Inc., Taipei (TW)

(72) Inventor: Ko-Chiang Lin, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 16/366,006

(22) Filed: Mar. 27, 2019

(65) Prior Publication Data

US 2019/0306857 A1 Oct. 3, 2019

Related U.S. Application Data

(60) Provisional application No. 62/649,417, filed on Mar. 28, 2018.

(51) Int. Cl.
*H04W 72/04* (2009.01)
*H04W 76/27* (2018.01)
(Continued)

(52) U.S. Cl.
CPC ....... *H04W 72/0446* (2013.01); *H04L 5/0007* (2013.01); *H04L 5/0053* (2013.01);
(Continued)

(58) Field of Classification Search
CPC ........... H04W 72/0446; H04W 72/042; H04W 24/08; H04W 76/27; H04L 5/0053; H04L 5/0007; H04L 5/0078
See application file for complete search history.

(56) References Cited

U.S. PATENT DOCUMENTS 9,867,211 B2 * 1/2018 Wijetunge ............ H04W 74/04
9,955,467 B2 * 4/2018 Wang .................... H04L 1/0038
(Continued)

FOREIGN PATENT DOCUMENTS

WO        2017/014556 A1    1/2017
WO     WO2018174653 A1    9/2018

OTHER PUBLICATIONS

Intel Corporation, Remaining details on GC PDCCH, 3GPP TSG RAN WG1 Meeting #92 R1-1802408, Athens, Greece, Feb. 26-Mar. 2, 2018 (Year: 2018).*

(Continued)

*Primary Examiner* — Mounir Moutaouakil
(74) *Attorney, Agent, or Firm* — Cooper Legal Group, LLC

(57) ABSTRACT

A method and apparatus are disclosed. In an example from the perspective of a User Equipment (UE), a configuration for monitoring downlink control information (DCI) indicative of a slot format may be received. In some examples, the configuration indicates the UE to monitor a first DCI in a first monitoring occasion associated with a slot and to monitor a second DCI in a second monitoring occasion. The first DCI is indicative of the slot format. Configured transmission and/or configured reception may be performed on one or more symbols when the first DCI is not received in the first monitoring occasion, the second DCI is received in the second monitoring occasion and the second DCI is indicative of the slot format for the slot. The one or more symbols are configured as flexible by a Radio Resource Control (RRC) configuration. The one or more symbols are in the slot.

20 Claims, 14 Drawing Sheets

(51) Int. Cl.
  *H04W 24/08* (2009.01)
  *H04L 5/00* (2006.01)
(52) U.S. Cl.
  CPC ......... *H04W 24/08* (2013.01); *H04W 72/042* (2013.01); *H04W 76/27* (2018.02)

(56) References Cited

U.S. PATENT DOCUMENTS

| | | | |
|---|---|---|---|
| 10,470,167 B2* | 11/2019 | Lee | H04W 72/1273 |
| 10,581,570 B2* | 3/2020 | Baker | H04W 72/1289 |
| 10,897,753 B2* | 1/2021 | Shaheen | H04W 72/0446 |
| 10,945,256 B2* | 3/2021 | Ugurlu | H04L 1/1819 |
| 2014/0328295 A1 | 11/2014 | Ko et al. | |
| 2018/0019843 A1* | 1/2018 | Papasakellariou | H04B 7/0413 |
| 2018/0279304 A1 | 9/2018 | Lee et al. | |
| 2018/0309513 A1 | 10/2018 | Kim et al. | |
| 2018/0310333 A1* | 10/2018 | Akkarakaran | H04W 72/0406 |
| 2018/0323935 A1* | 11/2018 | Yerramalli | H04L 5/0053 |
| 2019/0141742 A1* | 5/2019 | Zhou | H04W 28/20 |
| 2019/0149269 A1* | 5/2019 | Chatterjee | H04W 74/0858 370/329 |
| 2019/0149380 A1* | 5/2019 | Babaei | H04L 5/001 370/330 |
| 2019/0158205 A1* | 5/2019 | Sheng | H04J 11/0076 |
| 2019/0174518 A1* | 6/2019 | Jiang | H04W 72/1268 |
| 2019/0268923 A1* | 8/2019 | Sundararajan | H04W 72/1289 |
| 2019/0335478 A1* | 10/2019 | Xiong | H04L 5/14 |
| 2019/0349904 A1* | 11/2019 | Kwak | H04L 25/0238 |

OTHER PUBLICATIONS

Intel Corporation, Remaining issues on PDCCH formats and contents, 3GPP TSG-RAN WG1 Meeting #92 R1-1802409, Athens, Greece, Feb. 26-Mar. 2, 2018 (Year: 2018).*
"Corrections on UE-Group Common PDCCH", Feb. 17, 2018, Samsung, 3GPP TSG-RAN WG1 Meeting #92, R1-1801975, 3 pgs.
"Remaining Details on GC PDCCH", Feb. 17, 2018, INTEL Corporation, 3GPP TSG-RAN WG1 Meeting #92, R1-1802408, Athens, Greece, 5 pgs.
"Remaining Issues for SFI", May 20, 2018, ASUSTeK, 3GPP TSG-RAN WG1 Meeting #93, R1-1806913, Busan, Korea, 6 pgs.
EP Search Report cited in EP Application No. 19165411.0 dated Aug. 9, 2019, 9 pgs.
"2-Stage DCI", 3GPP TSG-RAN WG1 NR AdHoc; R1-1700815; Jan. 2017; Qualcomm Incorporated, Spokane, U.S.A, 4 pgs.
"DCI Monitoring Occasions and Blind Detections", Feb. 2017, 3GPP TSG-RAN WG1 Meeting #88; R1-1701643 Huawei, HiSilicon, Athens, Greece, 5 pgs.
"Corrections on EN-DC", Feb. 2018; 3GPP TSG-RAN WG2 Meeting #101; R2-180xxxx; Rapporteur (Ericsson); Athens,Greece, 275 pgs.
CATT: "Remaining Details of Slot Format Indication"; Mar. 2018; 3GPP TSG RAN WG1 Meeting #92, R1-1801729, 3rd Generation Partnership Project (3GG); Mobile Competence Centre; 650, Route Des Lucioles; vol. RAN WG1, Athens, Greece; 2 pgs.
Samsung: "Corrections on UE-Group Common PDCCH"; 2018; 3GPP TSG RAN WG1 Meeting #92, R1-1801975, GPP TSG RAN WG1 Meeting #92, R1-1801729, 3rd Generation Partnership Project (3GG); Mobile Competence Centre; 650, Route Des Lucioles; vol. RAN WG1, Athens, Greece; 3 pgs.
Corresponding Indian Patent Application No. 201914011896, Office Action dated Aug. 25, 2020. English Translation.
Intel Corporation, "Remaining Details on GC PDCCH", 3GPP TSG RAN WG1 Meeting #92, R1-1802408, Feb. 26-Mar. 2, 2018, Agenda Item 7.1.3.1.3, Document for Discussion and Decision, Athens, Greece.
Corresponding Japanese Patent Application No. 2019-060691, Office Action dated Oct. 27, 2020. English Translation.
Qualcomm Incorporated, "Offline Discussion Summary on Remaining issues on GC PDCCH Carrying SFI", 3GPP TSG RAN WG1 Meeting #92, R1-1803498, Feb.26-Mar. 2, 2018, Agenda Item 7.1.3.1.3, Document for Discussion and Decision, Athens, Greece.

* cited by examiner

500

| $\mu$ | $\Delta f = 2^\mu \cdot 15 \,[\text{kHz}]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

| $\mu$ | $N_{symb}^{slot}$ | $N_{slot}^{frame,\mu}$ | $N_{slot}^{subframe,\mu}$ |
|---|---|---|---|
| 2 | 12 | 40 | 4 |

| Format | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | D | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| 24 | D | D | D | X | X | X | X | X | X | X | X | X | U | U |
| 25 | D | X | X | X | X | X | X | X | X | X | X | U | U | U |
| 26 | D | D | X | X | X | X | X | X | X | X | X | U | U | U |
| 27 | D | D | D | X | X | X | X | X | X | X | X | U | U | U |
| 28 | D | D | D | D | D | D | D | D | D | D | D | D | X | U |
| 29 | D | D | D | D | D | D | D | D | D | D | D | X | X | U |
| 30 | D | D | D | D | D | D | D | D | D | D | X | X | X | U |
| 31 | D | D | D | D | D | D | D | D | D | D | D | X | U | U |
| 32 | D | D | D | D | D | D | D | D | D | D | X | X | U | U |
| 33 | D | D | D | D | D | D | D | D | D | X | X | X | U | U |
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |
| 37 | D | X | X | U | U | U | U | U | U | U | U | U | U | U |
| 38 | D | D | X | X | U | U | U | U | U | U | U | U | U | U |
| 39 | D | D | D | X | X | U | U | U | U | U | U | U | U | U |
| 40 | D | X | X | X | U | U | U | U | U | U | U | U | U | U |
| 41 | D | D | X | X | X | U | U | U | U | U | U | U | U | U |
| 42 | D | D | D | X | X | X | U | U | U | U | U | U | U | U |
| 43 | D | D | D | D | D | D | D | D | D | X | X | X | X | U |
| 44 | D | D | D | D | D | D | X | X | X | X | X | X | U | U |
| 45 | D | D | D | D | D | D | X | X | U | U | U | U | U | U |
| 46 | D | D | D | D | D | X | U | D | D | D | D | D | X | U |
| 47 | D | D | X | U | U | U | U | D | D | X | U | U | U | U |
| 48 | D | X | U | U | U | U | U | D | X | U | U | U | U | U |
| 49 | D | D | D | D | X | X | U | D | D | D | D | X | X | U |
| 50 | D | D | X | X | U | U | U | D | D | X | X | U | U | U |
| 51 | D | X | X | U | U | U | U | D | X | X | U | U | U | U |
| 52 | D | X | X | X | X | X | U | D | X | X | X | X | X | U |
| 53 | D | D | X | X | X | X | U | D | D | X | X | X | X | U |
| 54 | X | X | X | X | X | X | X | D | D | D | D | D | D | D |
| 55 | D | D | X | X | X | U | U | U | D | D | D | D | D | D |
| 56 – 255 | Reserved | | | | | | | | | | | | | |

FIG. 7

METHOD AND APPARATUS FOR SLOT FORMAT DETERMINATION IN A WIRELESS COMMUNICATION SYSTEM

CROSS-REFERENCE TO RELATED APPLICATIONS

The present application claims the benefit of U.S. Provisional Patent Application Ser. No. 62/649,417 filed on Mar. 28, 2018, the entire disclosure of which is incorporated herein in its entirety by reference.

FIELD

This disclosure generally relates to wireless communication networks, and more particularly, to a method and apparatus for slot format determination in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

In accordance with the present disclosure, one or more devices and/or methods are provided. In an example from the perspective of a User Equipment (UE), a configuration for monitoring downlink control information (DCI) indicative of a slot format may be received. In some examples, the configuration indicates the UE to monitor a first DCI in a first monitoring occasion associated with a slot and to monitor a second DCI in a second monitoring occasion. The first DCI is indicative of the slot format. Configured transmission and/or configured reception may be performed on one or more symbols when the first DCI is not received in the first monitoring occasion, the second DCI is received in the second monitoring occasion and the second DCI is indicative of the slot format for the slot. The one or more symbols are configured as flexible by a Radio Resource Control (RRC) configuration. The one or more symbols are in the slot. Alternatively and/or additionally, configured transmission and/or configured reception may not be performed on the one or more symbols when the first DCI is not received in the first monitoring occasion and the second DCI is not received in the second monitoring occasion.

BRIEF DESCRIPTION OF THE DRAWINGS

FIG. 5 illustrates a table associated with Orthogonal Frequency Division Multiplexing (OFDM) numerologies.

FIG. 6A illustrates a table associated with a number of OFDM symbols per slot, a number of slots per frame and/or a number of slots per subframe for a normal cyclic prefix (CP).

FIG. 6B illustrates a table associated with a number of OFDM symbols per slot, a number of slots per frame and/or a number of slots per subframe for an extended CP FIG. 7 illustrates a table associated with slot formats in a normal CP.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), $3^{rd}$ Generation Partnership Project (3GPP) LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including: R1-1803543, "draft CR to 38.211 capturing the Jan. 18 ad-hoc and RAN1 #92 meeting agreements", Ericsson; R1-1803554, 3GPP TS 38.213 V15.0.1, "NR Physical layer procedures for control"; 3GPP TSG RAN WG1 Meeting #92; 3GPP TS 38.211 V2.0.0, "NR Physical channels and modulation". The standards and documents listed above are hereby expressly incorporated by reference in their entirety.

Figure 1:
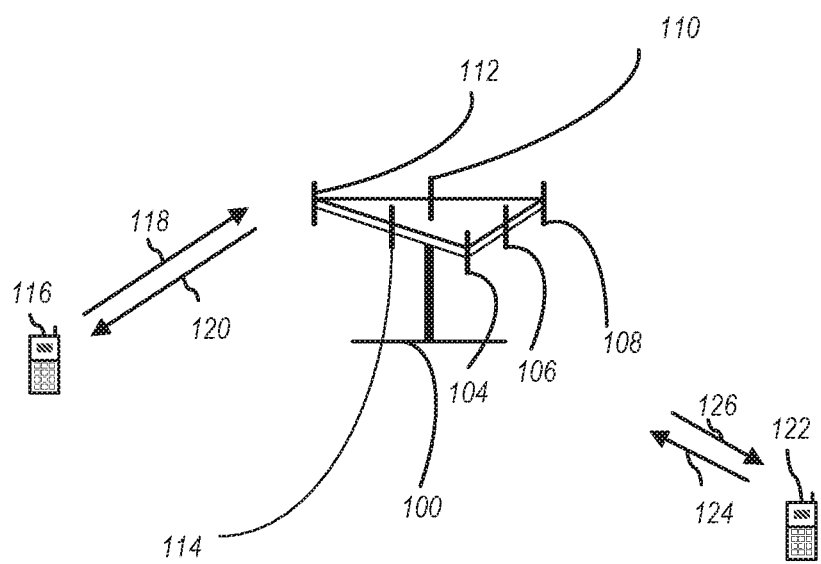
FIG. 1 shows a diagram of a wireless communication system according to one exemplary embodiment.

FIG. 1 presents a multiple access wireless communication system in accordance with one or more embodiments of the disclosure. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. AT 122 is in communication with antennas 106 and 108, where antennas 106 and 108 transmit information to AT 122 over forward link 126 and receive information from AT 122 over reverse link 124. In a frequency-division duplexing (FDD) system, communication links 118, 120, 124 and 126 may use different frequencies for communication. For example, forward link 120 may use a different frequency than that used by reverse link 118.

Each group of antennas and/or the area in which they are designed to communicate is often referred to as a sector of the access network. In the embodiment, antenna groups each may be designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage may normally cause less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an eNodeB, or some other terminology. An access terminal (AT) may also be called user equipment (UE), a wireless communication device, terminal, access terminal or some other terminology.

Figure 2:
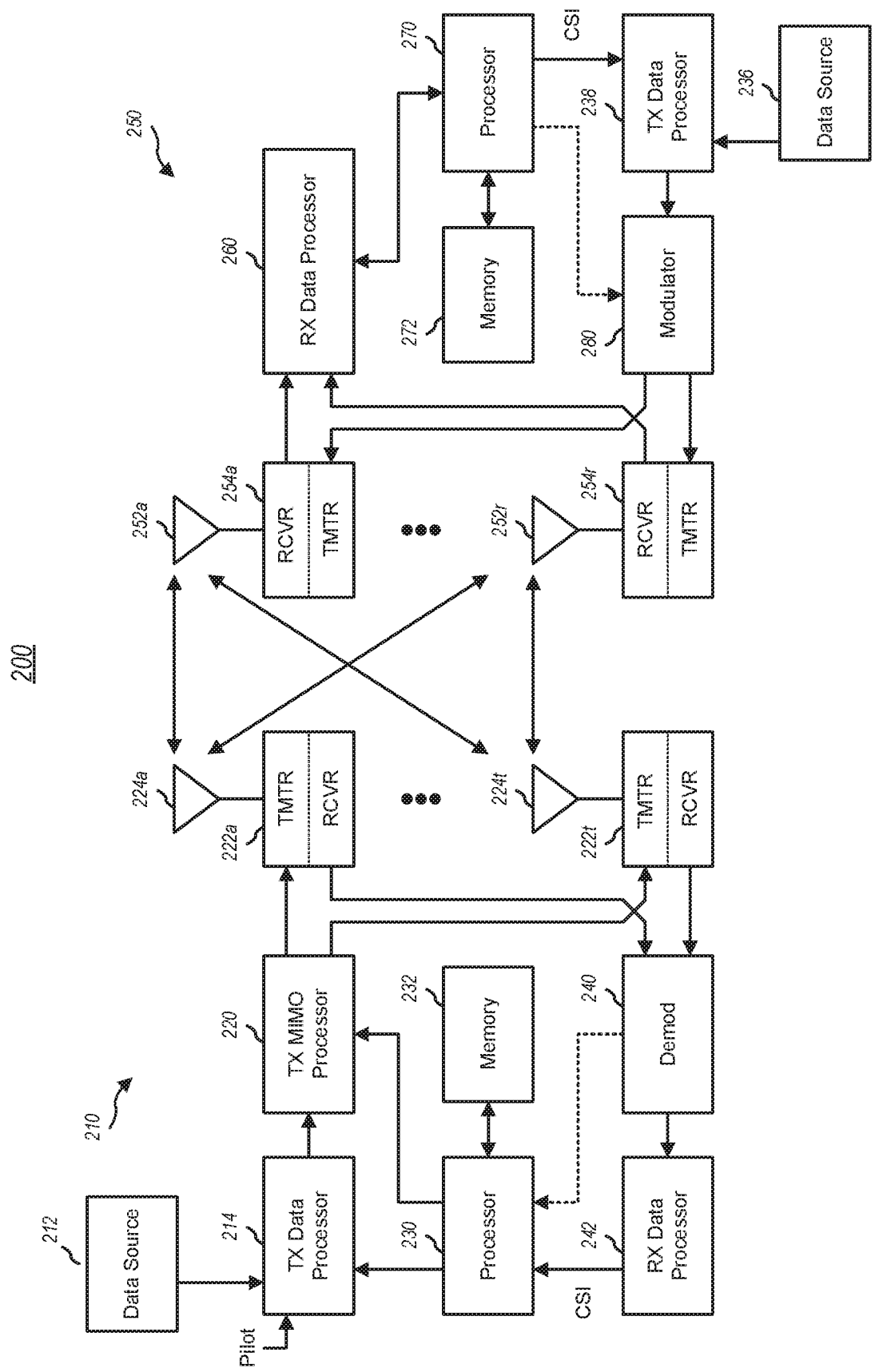
FIG. 2 is a block diagram of a transmitter system (also known as access network) and a receiver system (also known as user equipment or UE) according to one exemplary embodiment.

FIG. 2 presents an embodiment of a transmitter system 210 (also known as the access network) and a receiver system 250 (also known as access terminal (AT) or user equipment (UE)) in a multiple-input and multiple-output (MIMO) system 200. At the transmitter system 210, traffic data for a number of data streams may be provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data may typically be a known data pattern that is processed in a known manner and may be used at the receiver system to estimate the channel response. The multiplexed pilot and coded data for each data stream may then be modulated (i.e., symbol mapped) based on a particular modulation scheme (e.g., binary phase shift keying (BPSK), quadrature phase shift keying (QPSK), M-ary phase shift keying (M-PSK), or M-ary quadrature amplitude modulation (M-QAM)) selected for that data stream to provide modulation symbols. The data rate, coding, and/or modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 may apply beamforming weights to the symbols of the data streams and to the antenna from which the symbol is being transmitted.

Each transmitter 222 receives and processes a respective symbol stream to provide one or more analog signals, and further conditions (e.g., amplifies, filters, and/or upconverts) the analog signals to provide a modulated signal suitable for transmission over the MIMO channel. $N_T$ modulated signals from transmitters 222a through 222t may then be transmitted from $N_T$ antennas 224a through 224t, respectively.

At receiver system 250, the transmitted modulated signals are received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and/or further process the samples to provide a corresponding "received" symbol stream.

An RX data processor 260 then receives and/or processes the $N_R$ received symbol streams from $N_R$ receivers 254 based on a particular receiver processing technique to provide $N_T$ "detected" symbol streams. The RX data processor 260 may then demodulate, deinterleave, and/or decode each detected symbol stream to recover the traffic data for the data stream. The processing by RX data processor 260 may be complementary to that performed by TX MIMO processor 220 and TX data processor 214 at transmitter system 210.

A processor 270 may periodically determine which precoding matrix to use (discussed below). Processor 270 formulates a reverse link message comprising a matrix index portion and a rank value portion.

The reverse link message may comprise various types of information regarding the communication link and/or the received data stream. The reverse link message may then be processed by a TX data processor 238, which may also receive traffic data for a number of data streams from a data source 236, modulated by a modulator 280, conditioned by transmitters 254a through 254r, and/or transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 may then determine which pre-coding matrix to use for determining the beamforming weights and may then process the extracted message.

Figure 3:
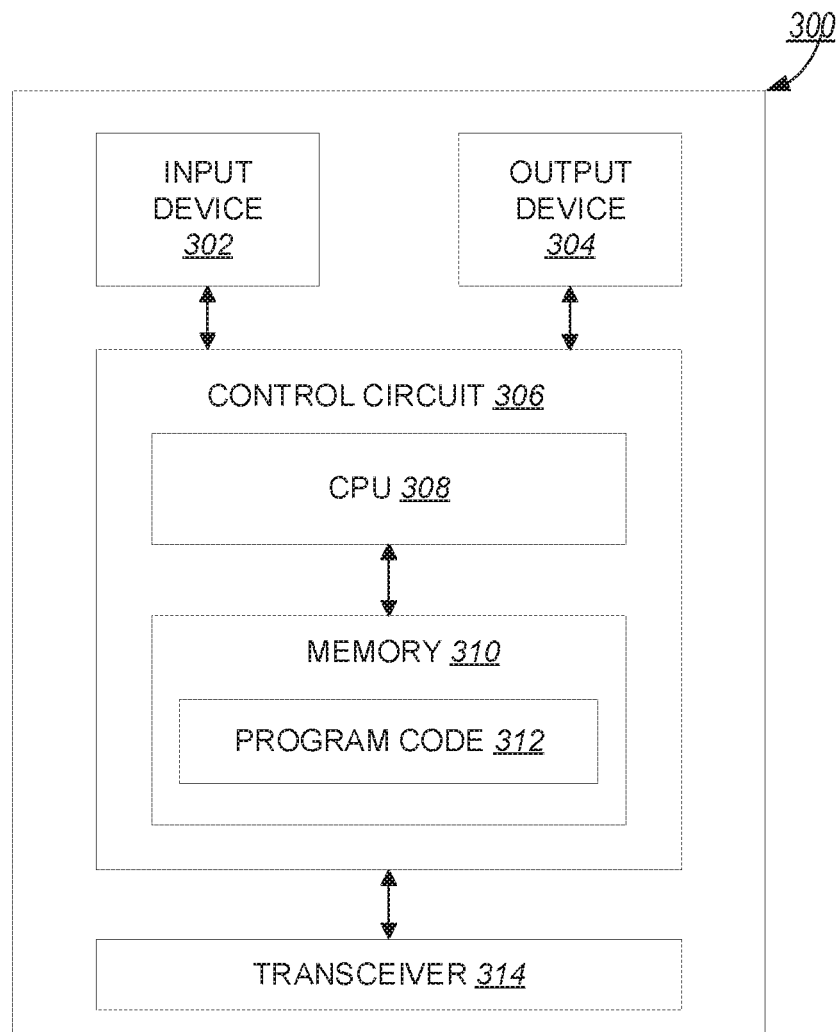
FIG. 3 is a functional block diagram of a communication system according to one exemplary embodiment.

FIG. 3 presents an alternative simplified functional block diagram of a communication device according to one embodiment of the disclosed subject matter. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
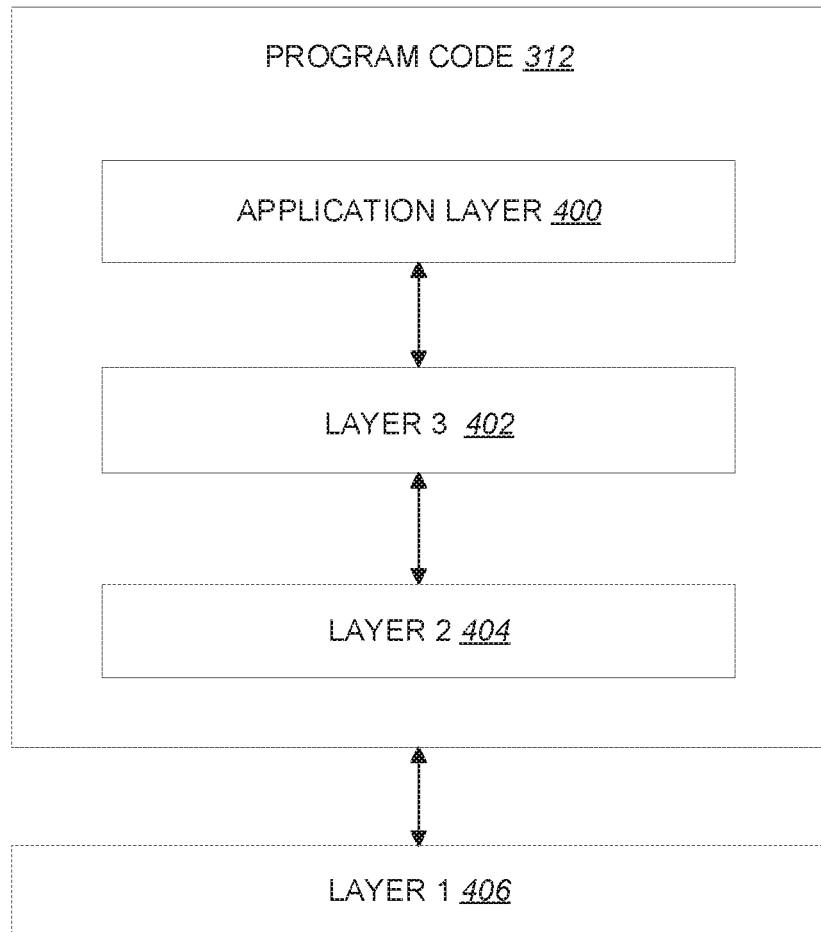
FIG. 4 is a functional block diagram of the program code of FIG. 3 according to one exemplary embodiment.

FIG. 4 is a simplified block diagram of the program code 312 shown in FIG. 3 in accordance with one embodiment of the disclosed subject matter. In this embodiment, the program code 312 includes an application layer 400, a Layer 3 portion 402, and a Layer 2 portion 404, and is coupled to a Layer 1 portion 406. The Layer 3 portion 402 may perform radio resource control. The Layer 2 portion 404 may perform link control. The Layer 1 portion 406 may perform and/or implement physical connections.

Because it may be difficult to fulfill various diverse requirements using a single numerology, more than one numerology may be adopted. In consideration of standardization efforts, implementation efforts and/or multiplexing capabilities associated with various numerologies it may be beneficial to have a relationship between different numerologies, such as an integral multiple relationship. Various numerology families, such as LTE 15 kHz and/or other numerologies may allow power N of 2 symbols in 1 ms.

New RAT (NR) frame structure, channels and/or numerology design are described below. In some examples, sizes of various fields in the time domain may be expressed in time units (e.g., $T_c=1/(\Delta f_{max}\cdot N_f)$, where $\Delta f_{max}=480\cdot 10^3$ Hz and $N_f=4096$). Alternatively and/or additionally, for a constant $\check{K}=T_s/T_c=64$, where $T_s=1/(\Delta f_{ref}\cdot N_{f,ref})$, $\Delta f_{ref}=15\cdot 10^3$ Hz and $N_{f,ref}=2048$.

FIG. 5 illustrates a table 500 associated with OFDM numerologies. For example, where $\mu$ and/or a cyclic prefix (CP) for a bandwidth part may be given by higher-layer parameters DL-BWP-mu and DL-BWP-cp for downlink (DL) (transmissions), and/or UL-BWP-mu and UL-BWP-cp for uplink (UL) (transmissions).

DL transmissions and/or UL transmissions may be organized into frames with $T_f=(\Delta f_{max} N_f/100)\cdot T_c=10$ ms duration, each consisting of ten subframes (and/or a different number of subframes) of $T_{sf}=(\Delta f_{max} N_f/1000)\cdot T_c=1$ ms duration. A number of consecutive OFDM symbols per subframe may be $N_{symb}^{subframe,\mu}=N_{symb}^{slot}N_{slot}^{subframe,\mu}$. Each frame may be divided into two equally-sized half-frames of five subframes each with half-frame 0 consisting of subframes 0-4 and half-frame 1 consisting of subframes 5-9. There may be one set of frames in the uplink and/or one set of frames in the DL on a carrier.

FIG. 6A illustrates a table 600 associated with a number of OFDM symbols per slot, a number of slots per frame and a number of slots per subframe for a normal CP. FIG. 6B illustrates a table 650 associated with a number of OFDM symbols per slot, a number of slots per frame and a number of slots per subframe for an extended CP. For subcarrier spacing configuration, $\mu$, slots may be numbered $n_s^\mu \in \{0, \ldots N_{slot}^{subframe,\mu}-1\}$ in increasing order within a subframe and $n_{s,f}^\mu \in \{0, \ldots N_{slot}^{frame\,\mu}-1\}$ in increasing order within a frame. There may be $N_{symb}^{slot}$ consecutive OFDM symbols in a slot where $N_{symb}^{slot}$ depends on the CP associated with the table 600 and/or the table 650. The start of slot $n_s^\mu$ in a subframe is aligned in time with the start of OFDM symbol $n_s^\mu N_{symb}^{slot}$ in the same subframe.

FIG. 7 illustrates a table 700 associated with slot formats in a normal CP. In some examples, FDM symbols in a slot can be classified as 'downlink' (denoted 'D' in the table 700), 'flexible' (denoted 'X' in the table 700) and/or 'uplink' (denoted 'U' in the table 700). The table 700 may be used when a Slot Format Indicator Radio Network Temporary Identifier (SFI-RNTI) is used for slot format indication (associated with 3GPP TS 38.213, where signaling of slot formats is described). In a slot in a DL frame, a UE shall assume that DL transmissions occur in 'downlink' and/or 'flexible' symbols. In a slot in an UL frame, the UE shall only transmit in 'uplink' and/or 'flexible' symbols.

As can be described above and/or illustrated in FIG. 7, NR frame structure provides a flexible framework of slot format to determine a transmission direction of each OFDM symbol. A slot configuration can be configured/carried by system information and/or a UE-specific RRC message and/or a UE may be informed of a set of OFDM symbol(s) being DL (by a higher layer configuration), a set of OFDM symbol(s) being flexible (by a higher layer configuration), and/or a set of OFDM symbol(s) being UL (by a higher layer configuration). A configured OFDM symbol type (e.g., DL, UL, flexible) could be overridden by a (different) signal (e.g., for an OFDM symbol being configured as flexible). For example, the (different) signal may be a DL assignment and/or an UL grant indicating a resource for DL reception and/or UL transmission on the OFDM symbol. The (different) signal may allow the UE to determine whether the OFDM symbol is UL or DL. The (different) signal may be a group common Physical Downlink Control Channel (PDCCH) (e.g., Downlink Control Information (DCI) Format 2-0), which may be indicative of a slot format for one or more slots. A slot format indicated for a slot may inform the UE of each OFDM symbol in the slot being a DL OFDM symbol, a UL OFDM symbol or a flexible OFDM symbol. The UE may not expect to receive a group common PDCCH indicating DL for an OFDM symbol configured as UL by higher layer signaling. Alternatively and/or additionally, the UE may not expect to receive a group common PDCCH indicating UL for an OFDM symbol configured as DL by higher layer signaling. For an OFDM symbol configured as flexible, a group common PDCCH may indicate the OFDM symbol as DL, flexible and/or UL. Transmission and/or reception of a channel or a signal may be influenced by the determination of a Slot Format Indicator (SFI).

In some examples, a slot format includes DL symbols, UL symbols, and flexible symbols. Alternatively and/or additionally, for each serving cell, if a UE is provided with higher layer parameter UL-DL-configuration-common, the UE shall set the slot format per slot over a number of slots as indicated by higher layer parameter UL-DL-configuration-common. Alternatively and/or additionally, if the UE is provided with higher layer parameter UL-DL-configuration-common-Set2, the UE shall set the slot format per slot over a first number of slots as indicated by higher layer parameter UL-DL-configuration-common and the UE shall set the slot format per slot over a second number of slots as indicated by UL-DL-configuration-common-Set2. Alternatively and/or additionally, if the UE is provided with a higher layer parameter UL-DL-configuration-dedicated for the slot format per slot over a number of slots, the parameter UL-DL-configuration-dedicated overrides only flexible symbols per slot over a number of slots as provided by UL-DL-configuration-common or UL-DL-configuration-common-Set2.

A first symbol for any even frame number $n_f$ starts at the same time as a first symbol for a number of slots provided by higher layer parameter UL-DL-configuration-common.

The UE may determine a duration (e.g., a DL duration), a flexible duration and/or a UL duration over a number of slots based on a subcarrier spacing configuration provided by higher layer parameter ref-scs. The DL duration, the flexible duration, and the UL duration are common to each configured BWP.

If a UE is not configured with higher layer parameter sfi-CelltoSFI and/or if a serving cell is not included in the set of serving cells provided by higher layer parameter sfi-CelltoSFI, the UE may consider symbols in a slot indicated as DL by higher layer parameters UL-DL-configuration-common, UL-DL-configuration-common-Set2, and/or UL-DL-configuration-dedicated as available for receptions. The UE may consider symbols in a slot indicated as UL by higher layer parameters UL-DL-configuration-common, UL-DL-configuration-common-Set2 and/or by UL-DL-configuration-dedicated as available for transmissions.

For a set of symbols of a slot that are indicated as flexible by higher layer parameters UL-DL-configuration-common, UL-DL-configuration-common-Set2, and/or UL-DL-configuration-dedicated, when provided to a UE, and/or when UL-DL-configuration-common, UL-DL-configuration-common-Set2, and UL-DL-configuration-dedicated are not provided to the UE, one or more operations may be performed by the UE. The one or more operations may comprise receiving Physical Downlink Shared Channel (PDSCH) and/or Channel State Information based Reference Signal (CSI-RS) in the set of symbols of the slot if the UE receives a corresponding indication by a DCI format with (cyclic redundancy check) CRC scrambled by Cell Radio Network Temporary Identifier (C-RNTI) and/or Configured Scheduling Radio Network Temporary Identifier (CS-RNTI) and/or a configuration by higher layers.

Alternatively and/or additionally, the one or more operations may comprise transmitting Physical Uplink Shared Channel (PUSCH), Physical Uplink Control Channel (PUCCH), Physical Random Access Channel (PRACH) and/or Sounding Reference Signal (SRS) in the set of symbols of the slot if the UE receives a corresponding indication by a DCI format with CRC scrambled by C-RNTI, CS-RNTI, Semi-Persistent (SP) Channel State Information (CSI) Radio Network Temporary Identifier (RNTI) (SP-CSI-RNTI) and/or Transmit Power Control (TPC) SRS-RNTI (TPC-SRS-RNTI) and triggering SRS transmission.

Alternatively and/or additionally, if the UE is configured by higher layers to receive a PDCCH, a PDSCH and/or a CSI-RS in the set of symbols of the slot, the one or more operations may comprise receiving the PDCCH, the PDSCH and/or the CSI-RS if the UE does not detect a DCI format with CRC scrambled by C-RNTI, CS-RNTI, SP-CSI-RNTI and/or TPC-SRS-RNTI that indicates to the UE to transmit a PUSCH, a PUCCH, a PRACH and/or a SRS in the set of symbols of the slot. Alternatively and/or additionally, the UE may not receive the PDCCH, the PDSCH and/or the CSI-RS in the set of symbols of the slot and may transmit the PUSCH, the PUCCH, the PRACH and/or the SRS in the set of symbols of the slot.

Alternatively and/or additionally, if the UE is configured by higher layers to transmit a periodic SRS, a PUCCH, a PUSCH and/or a PRACH in the set of symbols in the slot, the UE shall transmit the periodic SRS, the PUCCH, the PUSCH and/or the PRACH in the set of symbols of the slot if the UE does not detect a DCI format with CRC scrambled by C-RNTI and/or CS-RNTI that indicates to the UE to receive PDSCH and/or CSI-RS in the set of symbols in the slot. Alternatively and/or additionally, the UE may not transmit the periodic SRS, the PUCCH, the PUSCH and/or the PRACH in the set of symbols of the slot.

For a set of symbols of a slot that are indicated as UL by higher layer parameters UL-DL-configuration-common, UL-DL-configuration-common-Set2 and/or UL-DL-configuration-dedicated, when provided to a UE, the UE may not receive PDCCH, PDSCH, or CSI-RS in the set of symbols of the slot.

For a set of symbols of a slot that are indicated to a UE as DL by higher layer parameters UL-DL-configuration-common, UL-DL-configuration-common-Set2 and/or UL-DL-configuration-dedicated, when provided to a UE, the UE may not transmit PUSCH, PUCCH, PRACH, or SRS in the set of symbols of the slot.

For a set of symbols of a slot that are indicated by higher layer parameters SSB-transmitted-SIB1 and/or SSB-transmitted, when provided to a UE, for reception of SS/PBCH blocks, the UE may not transmit PUSCH, PUCCH, PRACH and/or SRS in the set of symbols of the slot.

If a UE is scheduled by a DCI format 1_1 to receive PDSCH over multiple slots, and/or if higher layer parameters UL-DL-configuration-common, UL-DL-configuration-common-Set2 and/or UL-DL-configuration-dedicated, when provided to the UE, indicate that, for a slot from the multiple slots, at least one symbol from a set of symbols where the UE is scheduled PDSCH reception in the slot is a UL symbol, the UE may not receive the PDSCH in the slot.

If a UE is scheduled by a DCI format 0_1 for a PUSCH transmission over multiple slots, and/or if higher layer parameter UL-DL-configuration-common, UL-DL-configuration-common-Set2, or UL-DL-configuration-dedicated, when provided to a UE, indicate that, for a slot from the multiple slots, at least one symbol from a set of symbols where the UE is scheduled PUSCH transmission in the slot is a DL symbol, the UE may not transmit the PUSCH in the slot.

In some examples, a UE may be configured with higher layer parameter SFI-applicable-cells. If a UE is configured by higher layers with parameter SFI-PDCCH, the UE may be configured with a SFI-RNTI provided by higher layer parameter SFI-RNTI and with a set of serving cells by higher layer parameter SFI-cell-to-SFI for monitoring PDCCH conveying DCI format 2_0. In some examples, for each serving cell of the set of serving cells the UE may be provided with a payload size of DCI format 2_0 by higher layer parameter SFI-DCI-payload-length, a location of an SFI-index field in DCI format 2_0 by higher layer parameter cell-to-SFI, a Control Channel Element (CCE) aggregation level $L_{SFI}$ for the PDCCH candidates by higher layer parameter SFI-aggregation-level and/or a number of $M_{p,s}^{(L_{SFI})}$ PDCCH candidates for CCE aggregation level $L_{SFI}$ by higher layer parameter SFI-Num-PDCCH-cand.

A DCI format 2_0 indicates a slot format for each slot in a number of slots for each DL bandwidth part BWP and/or each UL BWP of a serving cell by mapping a value of an SFI-index field in DCI format 2_0 for the serving cell to a combination of slot formats for the number of slots as provided by higher layer parameter slot-format-combination. The mapping between values of the SFI-index field and combinations of slot formats is provided by higher layer parameter slot-format-combination-index. A slot format is identified by a corresponding index.

For a set of symbols of a slot, a UE is not expected to detect a DCI format 2_0 indicating the set of symbols of the slot as uplink symbols and/or to detect a DCI format with CRC scrambled by C-RNTI indicating to the UE to receive PDSCH and/or CSI-RS in the set of symbols of the slot.

For a set of symbols of a slot, a UE is not expected to detect a DCI format 2_0 indicating the set of symbols in the slot as downlink symbols and/or to detect a DCI format with CRC scrambled by C-RNTI indicating to the UE to transmit PUSCH, PUCCH, PRACH and/or SRS in the set of symbols of the slot.

For a set of symbols of a slot that are indicated as DL and/or UL symbols by higher layer parameters UL-DL-configuration-common, UL-DL-configuration-common-Set2 and/or UL-DL-configuration-dedicated, when provided to a UE, the UE is not expected to detect a DCI format 2_0 indicating the set of symbols of the slot as UL and/or DL symbols, respectively, and/or as flexible.

For a set of symbols of a slot that are indicated as flexible symbols by higher layer parameters UL-DL-configuration-common, UL-DL-configuration-common-Set2 and/or UL-DL-configuration-dedicated, when provided to a UE, and/or when higher layer parameters UL-DL-configuration-common, UL-DL-configuration-common-Set2 and/or UL-DL-configuration-dedicated are not provided to the UE, and/or if the UE detects a DCI format 2_0 providing a format for the slot one or more second operations may be performed. For example, one or more symbols from the set of symbols are symbols in a control resource set configured (and/or transmitted) to the UE for PDCCH monitoring, the UE may receive PDCCH in the control resource set only if DCI format 2_0 indicates that the one or more symbols are DL symbols. Alternatively and/or additionally, if DCI format 2_0 indicates the set of symbols of the slot as flexible and/or the UE detects a DCI format with CRC scrambled by C-RNTI indicating to the UE to receive PDSCH and/or CSI-RS in the set of symbols of the slot, the UE may follow the indication of the DCI format with CRC scrambled by C-RNTI. Alternatively and/or additionally, if DCI format 2_0 indicates the set of symbols of the slot as flexible and/or the UE detects a DCI format with CRC scrambled by C-RNTI indicating to the UE to transmit PUSCH, PUCCH, PRACH and/or SRS in the set of symbols of the slot, the UE may follow the indication of the DCI format with CRC scrambled by C-RNTI. Alternatively and/or additionally, if DCI format 2_0 indicates the set of symbols of the slot as flexible, and/or the UE does not detect a DCI format with CRC scrambled by C-RNTI or CS-RNTI indicating to the UE to receive PDSCH or CSI-RS, and/or the UE does not detect a DCI format with CRC scrambled by C-RNTI, CS-RNTI, SP-CSI-RNTI, and/or TPC-SRS-RNTI indicating to the UE to transmit PUSCH, PUCCH, PRACH and/or SRS in the set of symbols of the slot, the UE may not transmit and/or receive in the set of symbols. Alternatively and/or additionally, if the UE is configured by higher layers transmission of periodic SRS, PUCCH, PUSCH and/or PRACH in the set of symbols of the slot, the UE may transmit the periodic SRS, the PUCCH, the PUSCH and/or the PRACH in the set of symbols of the slot only if DCI format 2_0 indicates the set of symbols of the slot as UL symbols.

If a UE is configured by higher layers with a transmission of periodic SRS, PUCCH, PUSCH and/or PRACH in a set of symbols of a slot and/or the UE detects a DCI format 2_0 indicating a subset of symbols from the set of symbols as DL or flexible, then the UE is not expected to cancel the transmission in symbols from the subset of symbols that occur, relative to a last symbol of a control resource set where the UE detects the DCI format 2_0, after a number of symbols that is smaller than the PUSCH preparation time $N_2$ for the corresponding PUSCH timing capability and/or the UE may cancel the transmission in remaining symbols of the slot.

If a UE is configured by higher layers with reception of CSI-RS and/or PDSCH in the set of symbols of the slot, the UE shall receive CSI-RS and/or PDSCH in the set of symbols of the slot only if the UE detects a DCI format 2_0 that indicates the set of symbols of the slot as DL.

If a UE is configured by higher layers transmission of periodic SRS, PUCCH, PUSCH without a UL grant and/or PRACH in the set of symbols of the slot, the UE may transmit the periodic SRS, the PUCCH, the PUSCH, and/or the PRACH in the set of symbols of the slot only if the UE detects a DCI format 2_0 that indicates the set of symbols of the slot as uplink and/or the set of symbols of the slot as DL and/or flexible, and a number of symbols between a last symbol of a control resource set where the UE detects the DCI format 2_0 and a first symbol in the set of symbols is smaller than the PUSCH preparation time $N_2$ for a corresponding PUSCH timing capability.

A UE assumes that flexible symbols in a control resource set configured and/or transmitted to the UE for PDCCH monitoring are DL symbols if the UE does not detect a DCI format 2_0 indicating the set of symbols of the slot as flexible and/or uplink.

For a set of symbols of a slot that are indicated as flexible by higher layer parameters UL-DL-configuration-common, UL-DL-configuration-common-Set2, and/or UL-DL-configuration-dedicated, when provided to a UE, and/or when higher layer parameters UL-DL-configuration-common UL-DL-configuration-common-Set2, and/or UL-DL-configuration-dedicated are not provided to the UE, and/or if the UE does not detect a DCI format 2_0 providing a format for the slot, the UE may receive PDSCH and/or CSI-RS in the set of symbols of the slot if the UE receives a corresponding indication by a DCI format with CRC scrambled by C-RNTI or CS-RNTI and/or a configuration by higher layers. Alternatively and/or additionally, the UE may transmit PUSCH, PUCCH, PRACH and/or SRS in the set of symbols of the slot if the UE receives a corresponding indication by a DCI format with CRC scrambled by C-RNTI, CS-RNTI, SP-CSI-RNTI and/or TPC-SRS-RNTI and triggering SRS transmission and/or a configuration by higher layers. Alternatively and/or additionally, the UE may receive PDCCH. Alternatively and/or additionally, if the UE is configured by higher layers for reception of PDSCH and/or CSI-RS in the set of symbols of the slot, the UE may not receive the PDSCH and/or the CSI-RS in the set of symbols of the slot. Alternatively and/or additionally, if the UE is configured by higher layers for transmission of periodic SRS, PUCCH, PUSCH and/or PRACH in the set of symbols of the slot, the UE may not transmit the periodic SRS, the PUCCH, the PUSCH and/or the PRACH in the set of symbols of the slot.

If a configured DCI format 2_0 is not received prior to a next configured DCI format 2_0 monitoring occasion, the UE may cancel one or more RRC configured transmissions and/or the UE may assume RRC configured DL transmission is not transmitted during semi-static configured flexible symbols.

In some examples, a group common PDCCH may be indicative of a combination of one or more slot formats for a period (e.g., one or more slots). The combination of the one or more slot formats and/or the period may be configured and/or indicated by higher layer signaling. The period of the combination of slot formats may be set independently from a monitoring period (also referred to as a monitoring periodicity) of the group common PDCCH. In some examples, if the period of the group common PDCCH is shorter than the monitoring period of the group common PDCCH, within the monitoring period associated with the group common PDCCH, there may be one or more slots for which one or more slot formats are not indicated by the group common PDCCH.

Alternatively and/or additionally, if the period of the group common PDCCH is longer than the monitoring period of the group common PDCCH, the combination indicated by the group common PDCCH may cover one or more slots in a next monitoring period. In some examples, there may be another group common PDCCH in the next monitoring period. Accordingly, the one or more slots may be covered (and/or indicated) by two group common PDCCHs. Alternatively and/or additionally, there may not be a group common PDCCH in the next monitoring period (e.g., because a monitoring occasion for group common PDCCH in the next monitoring period may be set to a UL symbol, a flexible symbol and/or a reserved symbol by a group common PDCCH in a previous monitoring period). If a UE falls back to (and/or uses) a more conservative slot format assumption (e.g., transmission and/or reception based upon configured transmission and/or reception), when a group common PDCCH is not received a slot format assumed by the UE may be inefficient. For example, an example of falling back (and/or using) a more conservative slot format is if UE cancels a Radio Resource Control (RRC) configured transmission and/or assumes an RRC configured transmission is not transmitted during semi-static configured flexible symbols. It may be necessary for the UE to efficiently determine a slot format when a group common PCCH is not received.

Figure 8:
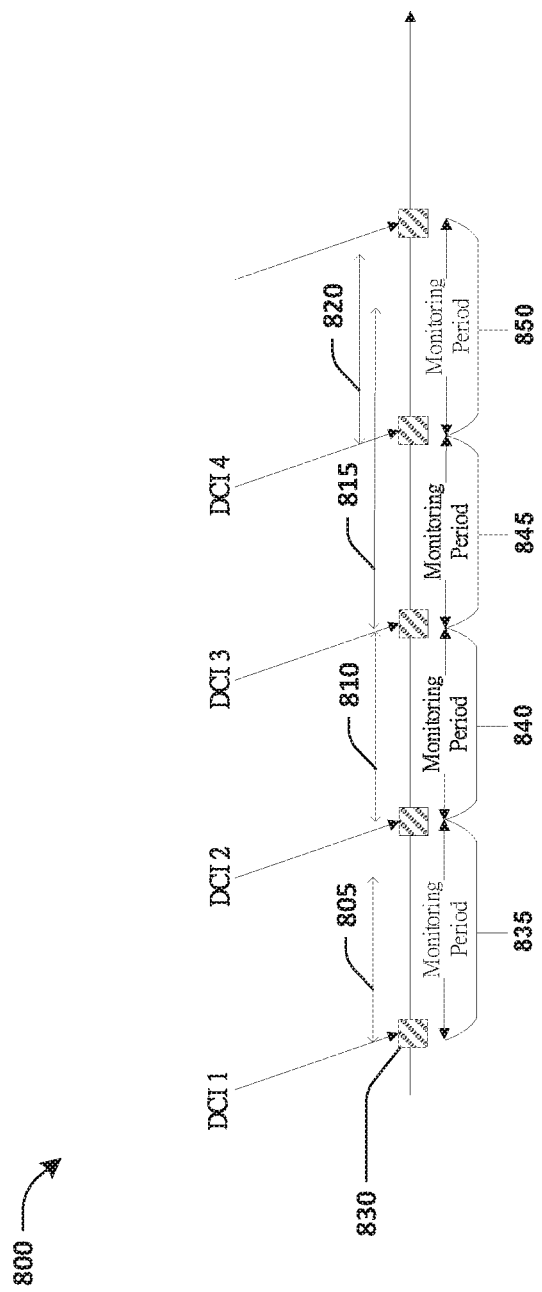
FIG. 8 illustrates an exemplary system where slot format combinations carried on Downlink Control Informations (DCIs) may be associated with different numbers of slots and/or periods.

FIG. 8 illustrates an exemplary system 800 where slot format combinations carried on DCIs may be associated with different numbers of slots and/or periods. In some examples, a DCI 1 may be received (by a UE, for example) via a monitoring occasion 830 (e.g., a monitoring occasion for group common PDCCH). The DCI 1 may be indicative of a slot format combination for a period 805 that is shorter than a monitoring period 835. In some examples, one or more dynamic SFIs for one or more slots associated with the monitoring period 835 may be undetermined (and/or may be absent from the DCI 1) (e.g., the one or more dynamic SFIs for the one or more slots may not be indicated by the DCI 1 and/or by a different DCI).

Alternatively and/or additionally, a DCI 2 may be received via a monitoring occasion (e.g., a monitoring occasion for group common PDCCH). The DCI 2 may be indicative of a slot format combination for a period 810 (that may not be shorter than a monitoring period 840 and/or that may not be longer than the monitoring period 840).

Alternatively and/or additionally, a DCI 3 may be received via a monitoring occasion (e.g., a monitoring occasion for group common PDCCH). The DCI 3 may be indicative of a slot format combination for a period 815 that is longer than a monitoring period 845. For example, the slot format combination for the period 815 may be indicative of one or more slot formats associated with the monitoring period 845 and/or a monitoring period 850.

Alternatively and/or additionally, a DCI 4 may be received via a monitoring occasion (e.g., a monitoring occasion for group common PDCCH). The DCI 4 may be indicative of a slot format combination for a period 820 that is associated with the monitoring period 850.

In some examples, the slot format combination for the period 815 may be indicative of one or more first slot formats associated with one or more overlapping slots of the monitoring period 850 and/or the slot format combination for the period 820 may be indicative of one or more second slot formats associated with the one or more overlapping slots of the monitoring period 850. In some examples, the one or more first slot formats associated with the one or more overlapping slots may be the same as the one or more second slot formats associated with the one or more overlapping slots. Alternatively and/or additionally, the one or more first slot formats associated with the one or more overlapping slots may be different than the one or more second slot formats associated with the one or more overlapping slots.

In an example, the one or more first slot formats associated with the DCI 3 may be indicative of an OFDM symbol of the one or more overlapping slots being DL and/or UL (e.g., being a DL symbol and/or a UL symbol), and/or the one or more second slot formats associated with the DCI 4 may be indicative of the OFDM being flexible (e.g., being a flexible symbol).

In another example, the one or more first slot formats associated with the DCI 3 may be indicative of an OFDM symbol of the one or more overlapping slots being flexible (e.g., being a flexible symbol), and/or the one or more second slot formats associated with the DCI 4 may be indicative of the OFDM being DL and/or UL (e.g., being a DL symbol and/or a UL symbol).

In another example, the one or more first slot formats associated with the DCI 3 may be indicative of an OFDM symbol of the one or more overlapping slots being UL (e.g., being a UL symbol), and/or the one or more second slot formats associated with the DCI 4 may be indicative of the OFDM being DL (e.g., being a DL symbol).

In another example, the one or more first slot formats associated with the DCI 3 may be indicative of an OFDM symbol of the one or more overlapping slots being DL (e.g., being a DL symbol), and/or the one or more second slot formats associated with the DCI 4 may be indicative of the OFDM being UL (e.g., being a UL symbol).

In some examples, a group common PDCCH (for SFI) may not be received by a UE. In a first situation, a UE may perform monitoring associated with a group common PDCCH and/or may not detect the group common PDCCH while performing the monitoring. In an example, the first situation may occur because a base station did not transmit the group common PDCCH to the UE (and/or one or more other UEs). Alternatively and/or additionally, the first situation may occur because the base station did transmit the group common PDCCH to the UE (and/or one or more other UEs), and/or the UE did not receive and/or decode the group common PDCCH (correctly). Accordingly, the UE may not distinguish whether the base station tried to update dynamic SFI (e.g., updating dynamic SFI may be associated with setting one or more OFDM symbols to one or more of reserved, flexible, etc.).

In a second situation, a UE may not perform monitoring, associated with a group common PDCCH, in a monitoring occasion. In an example, the second situation may occur because of a slot format associated with a slot associated with the monitoring occasion and/or the group common PDCCH.

For example, if one or more symbols (e.g., one symbol, a proportion of symbols, all symbols, etc.) of the slot associated with the monitoring occasion are configured by an RRC configuration as UL (e.g., if the one or more symbols are configured as one or more UL symbols), the UE may skip the monitoring occasion (and/or may not perform monitoring associated with the group common PDCCH).

Alternatively and/or additionally, if one or more symbols (e.g., one symbol, a proportion of symbols, all symbols, etc.) of the slot associated with the monitoring occasion are configured by a previous group common PDCCH as UL and/or flexible (e.g., if the one or more symbols are configured as one or more UL and/or flexible symbols), the UE may skip the monitoring occasion (and/or may not perform monitoring associated with the group common PDCCH).

Alternatively and/or additionally, if one or more symbols (e.g., one symbol, a proportion of symbols, all symbols, etc.) of the slot associated with the monitoring occasion are configured by a UL grant as UL (e.g., if the one or more symbols are configured as one or more UL symbols), the UE may skip the monitoring occasion (and/or may not perform monitoring associated with the group common PDCCH).

Alternatively and/or additionally, if PDCCH decoding capabilities and/or PDCCH monitoring capabilities within the slot associated with the monitoring occasion are exceeded, the UE may skip the monitoring occasion (and/or may not perform monitoring associated with the group common PDCCH).

A difference between the first situation and the second situation may be that, in the second situation, the UE may determine and/or identify a reason that the UE skips the monitoring occasion and/or may determine whether a base station is able to transmit a group common PDCCH (or not). Alternatively and/or additionally, if the UE skips the monitoring occasion due to one or more slot formats associated with one or more slots associated with the monitoring occasion, a base station may be unable to perform dynamic SFI updating for slots within a monitoring period associated with the monitoring occasion. Accordingly, it may be more efficient if the UE does not fall back to (and/or use) more conservative slot format assumption.

Figure 9:
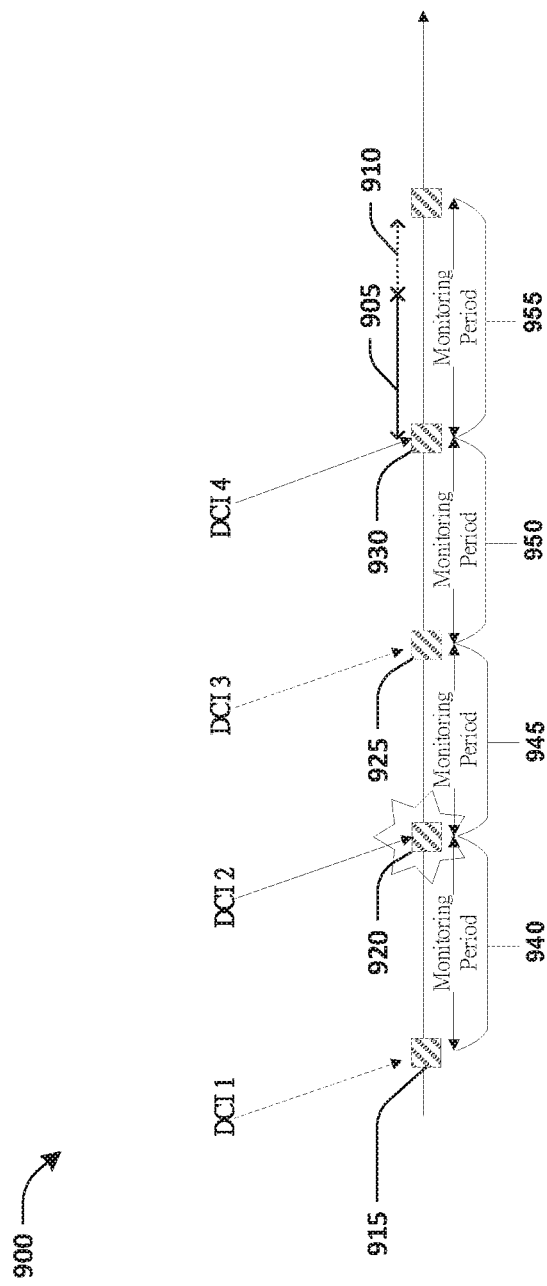
FIG. 9 illustrates an exemplary system associated with one or more examples of a first situation and a second situation.

FIG. 9 illustrates an exemplary system 900 associated with one or more examples of the first situation and the second situation. In some examples, a DCI 1 may not be transmitted (by a base station, for example) and/or the DCI 1 may not be received (by a UE, for example). For example, the DCI 1 may not be transmitted by the base station to the UE via a monitoring occasion 915. Accordingly, one or more slot formats associated with one or more slots associated with a monitoring period 940 may not be indicated by a group common PDCCH and/or one or more slot formats associated with the one or more slots may be underdetermined. The UE may perform monitoring associated with a group common PDCCH and/or may not detect and/or receive the DCI 1 while performing the monitoring during the monitoring occasion 915.

Alternatively and/or additionally, a DCI 2 may be transmitted by the base station to the UE and/or the UE may not receive the DCI 2. For example, the DCI 2 may not be received (by the UE) due to one or more of interference, channel conditions, etc. Accordingly, one or more slot formats associated with one or more slots associated with a monitoring period 945 may not be indicated by a group common PDCCH and/or may be underdetermined. Alternatively and/or additionally, the UE may perform monitoring associated with a group common PDCCH and/or may not detect and/or receive the DCI 2 while performing the monitoring during a monitoring occasion 920.

Alternatively and/or additionally, a DCI 3 may (and/or may not) be transmitted by the base station to the UE and/or the UE may not perform monitoring associated with a group common PDCCH in a monitoring occasion 925. For example, the UE may not perform the monitoring associated with the group common PDCCH in the monitoring occasion 925 due to one or more slot format settings associated with one or more slots and/or one or more symbols (of the monitoring occasion 925). Accordingly, one or more slot formats associated with one or more slots associated with a monitoring period 950 may not be indicated by a group common PDCCH and/or may be underdetermined.

In some examples, a DCI 4 may be received via a monitoring occasion 930 (e.g., a monitoring occasion for group common PDCCH). The DCI 4 may be indicative of a slot format combination for a period 905 that is shorter than a monitoring period 955. For example, the DCI 4 may not be indicative of one or more slot formats of one or more slots 910 associated with the monitoring period 955 (and/or the one or more slot formats of the one or more slots 910 may be undetermined).

It may be necessary that the UE determines slot formats associated with slots when the UE does not successfully receive a group common PDCCH. However, in existing technology, it remains unclear how the UE and/or a base station should assume and/or determine slot formats when the UE does not successfully receive a group common PDCCH (e.g., considering RRC configured transmission and/or RRC configured reception, for example).

Figure 10:
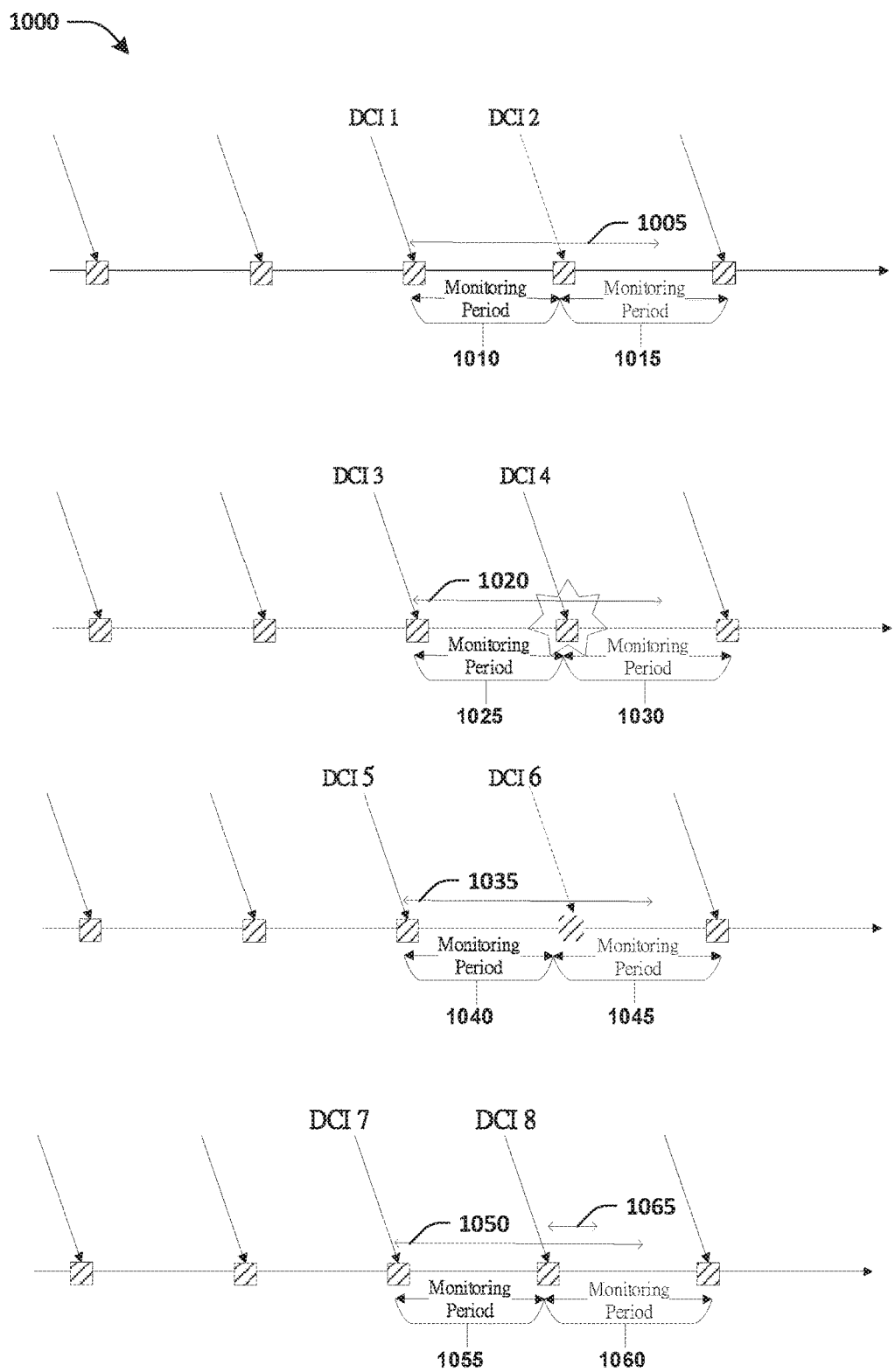
FIG. 10 illustrates an exemplary system where slot format combinations carried on DCIs may be associated with different numbers of slots and/or periods.

FIG. 10 illustrates an exemplary system 1000 where slot format combinations carried on DCIs may be associated with different numbers of slots and/or periods. In some examples, a DCI 1 may be received via a monitoring occasion (e.g., a monitoring occasion for group common PDCCH). The DCI 1 may be indicative of a slot format combination for a period 1005 that is longer than a monitoring period 1010. For example, the slot format combination for the period 1005 may be indicative of one or more slot formats associated with the monitoring period 1010 and/or a monitoring period 1015. Alternatively and/or additionally, a DCI 2 may not be transmitted by a base station and/or the DCI 2 may not be received by the UE.

Alternatively and/or additionally, a DCI 3 may be received via a monitoring occasion (e.g., a monitoring occasion for group common PDCCH). The DCI 3 may be indicative of a slot format combination for a period 1020 that is longer than a monitoring period 1025. For example, the slot format combination for the period 1020 may be indicative of one or more slot formats associated with the monitoring period 1025 and/or a monitoring period 1030. Alternatively and/or additionally, a DCI 4 may be transmitted by the base station to the UE and/or the UE may not receive the DCI 4 (due to one or more of interference, channel conditions, etc.).

Alternatively and/or additionally, a DCI 5 may be received via a monitoring occasion (e.g., a monitoring occasion for group common PDCCH). The DCI 5 may be indicative of a slot format combination for a period 1035 that is longer than a monitoring period 1040. For example, the slot format combination for the period 1035 may be indicative of one or more slot formats associated with the monitoring period 1040 and/or a monitoring period 1045. Alternatively and/or additionally, a DCI 6 may (and/or may not) be transmitted by the base station to the UE and/or the UE may not monitor (for) the DCI 6 via a monitoring occasion (and/or may not receive the DCI 6 via the monitoring occasion) due to one or more slot format settings associated with one or more slots and/or one or more symbols (of the monitoring occasion). For example, the DCI 5 may be indicative of one or more symbols (e.g., one symbol, a proportion of symbols, all symbols, etc.) associated with the monitoring occasion being flexible and/or UL and/or the UE may not monitor the monitoring occasion.

Alternatively and/or additionally, a DCI 7 may be received via a monitoring occasion (e.g., a monitoring occasion for group common PDCCH). The DCI 7 may be indicative of a slot format combination for a period 1050 that is longer than a monitoring period 1055. For example, the slot format combination for the period 1050 may be indicative of one or more slot formats associated with the monitoring period 1055 and/or a monitoring period 1060. Alternatively and/or additionally, a DCI 8 may be received via a monitoring occasion (e.g., a monitoring occasion for group common PDCCH). The DCI 8 may be indicative of a slot format combination for a period 1065 that is shorter than the monitoring period 1060. Alternatively and/or additionally, the slot format combination for the period 1050 (e.g., indicated by DCI 7) may be indicative of one or more slot formats associated with one or more slots of the monitoring period 1060 and/or the slot format combination for the period 1065 (e.g., indicated by DCI 8) may not be indicative of any slot formats for the one or more slots (of the monitoring period 1060). In existing technology, it remains unclear how the UE and/or a base station should assume and/or determine slot formats associated with the one or more slots (of the monitoring period 1060), and/or how the UE and/or a base station should assume and/or determine slot formats associated with slots where periods of DCIs overlap (e.g., considering RRC configured transmission and/or RRC configured reception, for example).

In a first embodiment, when a UE does not receive a group common PDCCH associated with a slot, the UE may determine how to handle and/or perform configured transmission and/or configured reception in the slot. For example, the UE may not receive the group common PDCCH for the slot via a monitoring occasion associated with the slot.

It may be appreciated that various examples where the UE does not receive the group common PDCCH for the slot may be contemplated. For example, an example where the UE does not receive the group common PDCCH for the slot may be associated with one or more of the conditions described below. Further, depending on one or more conditions that are met, one or more of the actions described below may be performed in order to handle and/or perform configured transmission and/or configured reception in the slot, wherein one or more actions may be selected and/or performed based upon the one or more conditions.

Condition A may be met if a UE monitors (for) the group common PDCCH in a monitoring occasion associated with the slot and/or the UE does not detect and/or receive the group common PDCCH while monitoring (for) the group common PDCCH in the monitoring occasion (e.g., an example of which is illustrated in FIG. 9 where the DCI 1 is not transmitted by the base station to the UE via the monitoring occasion 915 and/or where the DCI2 is transmitted by the base station to the UE and/or the UE does not receive the DCI 2).

Condition B may be met if a base station does not transmit the group common PDCCH to the UE in a monitoring occasion associated with the slot (e.g., an example of which is illustrated in FIG. 9 where the DCI 1 is not transmitted by the base station to the UE via the monitoring occasion 915).

Condition C may be met if a base station transmits the group common PDCCH to the UE and/or the UE does not (successfully) receive and/or decode the group common PDCCH correctly in a monitoring occasion associated with the slot (e.g., an example of which is illustrated in FIG. 9 where the DCI2 is transmitted by the base station to the UE and/or the UE does not receive the DCI 2).

Condition D may be met if the UE does not monitor (for) the group common PDCCH in a monitoring occasion associated with the slot (e.g., an example of which is illustrated in FIG. 9 where the UE does not perform the monitoring associated with the DCI 3 in the monitoring occasion 925).

Condition D1 may be met if the UE does not monitor (for) the group common PDCCH in a monitoring occasion associated with the slot because one or more symbols (e.g., one symbol, a proportion of symbols, all symbols, etc.) of the slot associated with the monitoring occasion are configured and/or indicated as being UL (symbols) by a previous group common PDCCH in a previous monitoring occasion (e.g., an example of which is illustrated in FIG. 9 where the UE does not perform the monitoring associated with the DCI 3 in the monitoring occasion 925).

Condition D2 may be met if the UE does not monitor (for) the group common PDCCH in a monitoring occasion associated with the slot because one or more symbols (e.g., one symbol, a proportion of symbols, all symbols, etc.) of the slot associated with the monitoring occasion are configured and/or indicated as being flexible (symbols) by a previous group common PDCCH in a previous monitoring occasion (e.g., an example of which is illustrated in FIG. 9 where the UE does not perform the monitoring associated with the DCI 3 in the monitoring occasion 925).

Condition D3 may be met if the UE does not monitor (for) the group common PDCCH in a monitoring occasion associated with the slot because one or more symbols (e.g., one symbol, a proportion of symbols, all symbols, etc.) of the slot associated with the monitoring occasion are configured and/or indicated as being UL (symbols) by a higher layer configuration (e.g., an example of which is illustrated in FIG. 9 where the UE does not perform the monitoring associated with the DCI 3 in the monitoring occasion 925).

Condition D4 may be met if the UE does not monitor (for) the group common PDCCH in a monitoring occasion associated with the slot because one or more symbols (e.g., one symbol, a proportion of symbols, all symbols, etc.) of the slot associated with the monitoring occasion are configured and/or indicated as being flexible (symbols) by a higher layer configuration (e.g., an example of which is illustrated in FIG. 9 where the UE does not perform the monitoring associated with the DCI 3 in the monitoring occasion 925).

Condition E may be met if the UE monitors (for) the group common PDCCH in a monitoring occasion associated with the slot, the UE does not detect and/or receive the group common PDCCH while monitoring (for) the group common PDCCH in the monitoring occasion, and/or a previous group common PDCCH, indicative of a slot format associated with the slot, is received in a previous monitoring occasion (e.g., an example of which is illustrated in FIG. 10 where the DCI 2 is not transmitted by the base station and/or is not received by the UE via a monitoring occasion and/or the DCI 1 is received via a previous monitoring occasion and/or is indicative of one or more slot formats associated with the monitoring occasion and/or the period 1005, another example of which is illustrated in FIG. 10 where the DCI 4 is transmitted by the base station and/or is not received by the UE via a monitoring occasion and/or the DCI 3 is received via a previous monitoring occasion and/or is indicative of one or more slot formats associated with the monitoring occasion and/or the period 1020).

Condition F may be met if a base station does not transmit the group common PDCCH to the UE in a monitoring occasion associated with the slot and/or a previous group common PDCCH, indicative of a slot format associated with the slot, is received in a previous monitoring occasion (e.g., an example of which is illustrated in FIG. 10 where the DCI 2 is not transmitted by the base station and/or is not received by the UE via a monitoring occasion and/or the DCI 1 is received via a previous monitoring occasion and/or is indicative of one or more slot formats associated with the monitoring occasion and/or the period 1005).

Condition G may be met if a base station transmits the group common PDCCH to the UE, the UE does not (successfully) receive and/or decode the group common PDCCH correctly in a monitoring occasion associated with the slot and/or a previous group common PDCCH, indicative of a slot format associated with the slot, is received in a previous monitoring occasion (e.g., an example of which is illustrated in FIG. 10 where the DCI 4 is transmitted by the base station and/or is not received by the UE via a monitoring occasion and/or the DCI 3 is received via a previous monitoring occasion and/or is indicative of one or more slot formats associated with the monitoring occasion and/or the period 1020).

Condition H may be met if the UE does not monitor (for) the group common PDCCH in a monitoring occasion associated with the slot and/or a previous group common PDCCH, indicative of a slot format associated with the slot, is received in a previous monitoring occasion (e.g., an example of which is illustrated in FIG. 10 where the DCI 6 is (and/or is not) transmitted by the base station, the UE does not monitor (for) the DCI 6 via a monitoring occasion and/or the DCI 5 is received via a previous monitoring occasion and/or is indicative of one or more slot formats associated with the monitoring occasion and/or the period 1035).

Condition H1 may be met if the UE does not monitor (for) the group common PDCCH in a monitoring occasion associated with the slot and/or a previous group common PDCCH, indicative of one or more symbols (e.g., one symbol, a proportion of symbols, all symbols, etc.) associated with the monitoring occasion as being UL (symbols), is received in a previous monitoring occasion (e.g., an example of which is illustrated in FIG. 10 where the DCI 6 is (and/or is not) transmitted by the base station, the UE does not monitor (for) the DCI 6 via a monitoring occasion and/or the DCI 5 is received via a previous monitoring occasion and/or is indicative of one or more slot formats associated with the monitoring occasion and/or the period 1035).

Condition H2 may be met if the UE does not monitor (for) the group common PDCCH in a monitoring occasion associated with the slot and/or a previous group common PDCCH, indicative of one or more symbols (e.g., one symbol, a proportion of symbols, all symbols, etc.) associated with the monitoring occasion as being flexible (symbols), is received in a previous monitoring occasion (e.g., an example of which is illustrated in FIG. 10 where the DCI 6 is (and/or is not) transmitted by the base station, the UE does not monitor (for) the DCI 6 via a monitoring occasion and/or the DCI 5 is received via a previous monitoring occasion and/or is indicative of one or more slot formats associated with the monitoring occasion and/or the period 1035).

Condition H3 may be met if the UE does not monitor (for) the group common PDCCH in a monitoring occasion associated with the slot and/or a previous group common PDCCH, indicative of a slot format associated with the slot, is received in a previous monitoring occasion, wherein a higher layer configuration is indicative of one or more symbols (e.g., one symbol, a proportion of symbols, all symbols, etc.) associated with the monitoring occasion as being UL (symbols) (e.g., an example of which is illustrated in FIG. 10 where the DCI 6 is (and/or is not) transmitted by the base station, the UE does not monitor (for) the DCI 6 via a monitoring occasion and/or the DCI 5 is received via a previous monitoring occasion and/or is indicative of one or more slot formats associated with the monitoring occasion and/or the period 1035).

Condition H4 may be met if the UE does not monitor (for) the group common PDCCH in a monitoring occasion associated with the slot and/or a previous group common PDCCH, indicative of a slot format associated with the slot, is received in a previous monitoring occasion, wherein a higher layer configuration is indicative of one or more symbols (e.g., one symbol, a proportion of symbols, all symbols, etc.) associated with the monitoring occasion as being flexible (symbols) (e.g., an example of which is illustrated in FIG. 10 where the DCI 6 is (and/or is not) transmitted by the base station, the UE does not monitor (for) the DCI 6 via a monitoring occasion and/or the DCI 5 is received via a previous monitoring occasion and/or is indicative of one or more slot formats associated with the monitoring occasion and/or the period 1035).

The actions described below may be performed in order to handle and/or perform configured transmission and/or configured reception in the slot.

Action 1 may comprise performing configured transmission on one or more symbols configured as flexible (symbols) by RRC.

Action 2 may comprise performing configured reception on one or more symbols configured as flexible (symbols) by RRC.

Action 3 may comprise not performing configured transmission on one or more symbols configured as flexible (symbols) by RRC.

Action 4 may comprise not performing configured reception on one or more symbols configured as flexible (symbols) by RRC.

Action 5 may comprise not performing configured transmission on one or more symbols configured as flexible (symbols) by RRC and/or performing configured transmission on one or more symbols configured as UL (symbols) by RRC.

Action 6 may comprise not performing configured reception on one or more symbols configured as flexible (symbols) by RRC and/or performing configured reception on one or more symbols configured as DL (symbols) by RRC.

Action 7 may comprise deciding whether to perform configured transmission based upon a previous group common PDCCH received in a previous monitoring occasion.

Action 8 may comprise deciding whether to perform configured reception based upon a previous group common PDCCH received in a previous monitoring occasion.

In an example, if Condition A, Condition B, Condition C, Condition D2 and/or Condition D4 are met, a UE may perform Action 3 and/or Action 4. Alternatively and/or additionally, if Condition D, Condition D1, Condition D2, Condition D3 and/or Condition D4 are met, the UE may perform Action 1 and/or Action 2. For example, if Condition A, Condition B, Condition C, Condition D2 and/or Condition D4 are met, the UE may handle and/or perform configured transmission and/or configured reception based upon Action 3 and/or Action 4. Alternatively and/or additionally, if Condition D, Condition D1, Condition D2, Condition D3 and/or Condition D4 are met, the UE may handle and/or perform configured transmission and/or configured reception based upon Action 1 and/or Action 2.

In another example, if Condition A, Condition B, Condition C, Condition D2 and/or Condition D4 are met, a UE may perform Action 5 and/or Action 6. Alternatively and/or additionally, if Condition D, Condition D1, Condition D2, Condition D3 and/or Condition D4 are met, the UE may perform Action 1 and/or Action 2. For example, if Condition A, Condition B, Condition C, Condition D2 and/or Condition D4 are met, the UE may handle and/or perform configured transmission and/or configured reception based upon Action 5 and/or Action 6. Alternatively and/or additionally, if Condition D, Condition D1, Condition D2, Condition D3 and/or Condition D4 are met, the UE may handle and/or perform configured transmission and/or configured reception based upon Action 1 and/or Action 2.

In another example, if Condition E, Condition F, Condition G, Condition H2 and/or Condition H4 are met, a UE may perform Action 3 and/or Action 4. Alternatively and/or additionally, if Condition H, Condition H1, Condition H2, Condition H3 and/or Condition H4 are met, the UE may perform Action 7 and/or Action 8. For example, if Condition E, Condition F, Condition G, Condition H2 and/or Condition H4 are met, the UE may handle and/or perform configured transmission and/or configured reception based upon Action 3 and/or Action 4. Alternatively and/or additionally, if Condition H, Condition H1, Condition H2, Condition H3 and/or Condition H4 are met, the UE may handle and/or perform configured transmission and/or configured reception based upon Action 7 and/or Action 8.

In another example, if Condition E, Condition F, Condition G, Condition H2 and/or Condition H4 are met, a UE may perform Action 3 and/or Action 4. Alternatively and/or additionally, if Condition H, Condition H1, Condition H2, Condition H3 and/or Condition H4 are met, the UE may perform Action 1 and/or Action 2. For example, if Condition E, Condition F, Condition G, Condition H2 and/or Condition H4 are met, the UE may handle and/or perform configured transmission and/or configured reception based upon Action 3 and/or Action 4. Alternatively and/or additionally, if Condition H, Condition H1, Condition H2, Condition H3 and/or Condition H4 are met, the UE may handle and/or perform configured transmission and/or configured reception based upon Action 1 and/or Action 2.

In another example, if Condition E, Condition F, Condition G, Condition H2 and/or Condition H4 are met, a UE may perform Action 5 and/or Action 6. Alternatively and/or additionally, if Condition H, Condition H1, Condition H2, Condition H3 and/or Condition H4 are met, the UE may perform Action 7 and/or Action 8. For example, if Condition E, Condition F, Condition G, Condition H2 and/or Condition H4 are met, the UE may handle and/or perform configured transmission and/or configured reception based upon Action 5 and/or Action 6. Alternatively and/or additionally, if Condition H, Condition H1, Condition H2, Condition H3 and/or Condition H4 are met, the UE may handle and/or perform configured transmission and/or configured reception based upon Action 7 and/or Action 8.

In another example, if Condition E, Condition F, Condition G, Condition H2 and/or Condition H4 are met, a UE may perform Action 5 and/or Action 6. Alternatively and/or additionally, if Condition H, Condition H1, Condition H2, Condition H3 and/or Condition H4 are met, the UE may perform Action 1 and/or Action 2. For example, if Condition E, Condition F, Condition G, Condition H2 and/or Condition H4 are met, the UE may handle and/or perform configured transmission and/or configured reception based upon Action 5 and/or Action 6. Alternatively and/or additionally, if Condition H, Condition H1, Condition H2, Condition H3 and/or Condition H4 are met, the UE may handle and/or perform configured transmission and/or configured reception based upon Action 1 and/or Action 2.

In another example, if Condition A, Condition B, Condition C, Condition D2 and/or Condition D4 are met, a UE may perform Action 3 and/or Action 4. Alternatively and/or additionally, if Condition D, Condition D1, Condition D2, Condition D3 and/or Condition D4 are met, the UE may perform Action 1 and/or Action 2. Alternatively and/or additionally, if Condition E, Condition F, Condition G, Condition H2 and/or Condition H4 are met, the UE may perform Action 3 and/or Action 4. Alternatively and/or additionally, if Condition H, Condition H1, Condition H2, Condition H3 and/or Condition H4 are met, the UE may perform Action 7 and/or Action 8. For example, if Condition A, Condition B, Condition C, Condition D2 and/or Condition D4 are met, the UE may handle and/or perform configured transmission and/or configured reception based upon Action 3 and/or Action 4. Alternatively and/or additionally, if Condition D, Condition D1, Condition D2, Condition D3 and/or Condition D4 are met, the UE may handle and/or perform configured transmission and/or configured reception based upon Action 1 and/or Action 2. Alternatively and/or additionally, if Condition E, Condition F, Condition G, Condition H2 and/or Condition H4 are met, the UE may handle and/or perform configured transmission and/or configured reception based upon Action 3 and/or Action 4. Alternatively and/or additionally, if Condition H, Condition H1, Condition H2, Condition H3 and/or Condition H4 are met, the UE may handle and/or perform configured transmission and/or configured reception based upon Action 7 and/or Action 8.

In another example, if Condition A, Condition B, Condition C, Condition D2 and/or Condition D4 are met, a UE may perform Action 5 and/or Action 6. Alternatively and/or additionally, if Condition D, Condition D1, Condition D2, Condition D3 and/or Condition D4 are met, the UE may perform Action 1 and/or Action 2. Alternatively and/or additionally, if Condition E, Condition F, Condition G, Condition H2 and/or Condition H4 are met, the UE may perform Action 5 and/or Action 6. Alternatively and/or additionally, if Condition H, Condition H1, Condition H2, Condition H3 and/or Condition H4 are met, the UE may perform Action 7 and/or Action 8. For example, if Condition A, Condition B, Condition C, Condition D2 and/or Condition D4 are met, the UE may handle and/or perform configured transmission and/or configured reception based upon Action 5 and/or Action 6. Alternatively and/or additionally, if Condition D, Condition D1, Condition D2, Condition D3 and/or Condition D4 are met, the UE may handle and/or perform configured transmission and/or configured reception based upon Action 1 and/or Action 2. Alternatively and/or additionally, if Condition E, Condition F, Condition G, Condition H2 and/or Condition H4 are met, the UE may handle and/or perform configured transmission and/or configured reception based upon Action 5 and/or Action 6. Alternatively and/or additionally, if Condition H, Condition H1, Condition H2, Condition H3 and/or Condition H4 are met, the UE may handle and/or perform configured transmission and/or configured reception based upon Action 7 and/or Action 8.

In another example, if Condition A, Condition B, Condition C, Condition D2 and/or Condition D4 are met, a UE may perform Action 3 and/or Action 4. Alternatively and/or additionally, if Condition D, Condition D1, Condition D2, Condition D3 and/or Condition D4 are met, the UE may perform Action 1 and/or Action 2. Alternatively and/or additionally, if Condition E, Condition F, Condition G, Condition H2 and/or Condition H4 are met, the UE may perform Action 3 and/or Action 4. Alternatively and/or additionally, if Condition H, Condition H1, Condition H2, Condition H3 and/or Condition H4 are met, the UE may perform Action 1 and/or Action 2. For example, if Condition A, Condition B, Condition C, Condition D2 and/or Condition D4 are met, the UE may handle and/or perform configured transmission and/or configured reception based upon Action 3 and/or Action 4. Alternatively and/or additionally, if Condition D, Condition D1, Condition D2, Condition D3 and/or Condition D4 are met, the UE may handle and/or perform configured transmission and/or configured reception based upon Action 1 and/or Action 2. Alternatively and/or additionally, if Condition E, Condition F, Condition G, Condition H2 and/or Condition H4 are met, the UE may handle and/or perform configured transmission and/or configured reception based upon Action 3 and/or Action 4. Alternatively and/or additionally, if Condition H, Condition H1, Condition H2, Condition H3 and/or Condition H4 are met, the UE may handle and/or perform configured transmission and/or configured reception based upon Action 1 and/or Action 2.

In another example, if Condition A, Condition B, Condition C, Condition D2 and/or Condition D4 are met, a UE may perform Action 5 and/or Action 6. Alternatively and/or additionally, if Condition D, Condition D1, Condition D2, Condition D3 and/or Condition D4 are met, the UE may perform Action 1 and/or Action 2. Alternatively and/or additionally, if Condition E, Condition F, Condition G, Condition H2 and/or Condition H4 are met, the UE may perform Action 5 and/or Action 6. Alternatively and/or additionally, if Condition H, Condition H1, Condition H2, Condition H3 and/or Condition H4 are met, the UE may perform Action 1 and/or Action 2. For example, if Condition A, Condition B, Condition C, Condition D2 and/or Condition D4 are met, the UE may handle and/or perform configured transmission and/or configured reception based upon Action 5 and/or Action 6. Alternatively and/or additionally, if Condition D, Condition D1, Condition D2, Condition D3 and/or Condition D4 are met, the UE may handle and/or perform configured transmission and/or configured reception based upon Action 1 and/or Action 2. Alternatively and/or additionally, if Condition E, Condition F, Condition G, Condition H2 and/or Condition H4 are met, the UE may handle and/or perform configured transmission and/or configured reception based upon Action 5 and/or Action 6. Alternatively and/or additionally, if Condition H, Condition H1, Condition H2, Condition H3 and/or Condition H4 are met, the UE may handle and/or perform configured transmission and/or configured reception based upon Action 1 and/or Action 2.

In another example, if Condition A, Condition B, Condition C, Condition D, Condition D1, Condition D2, Condition D3, Condition D4, Condition E, Condition F, Condition G, Condition H, Condition H1, Condition H2, Condition H3 and/or Condition H4 are met, a UE may perform Action 1, Action 2, Action 3, Action 4, Action 5, Action 6, Action 7 and/or Action 8. For example, if Condition A, Condition B, Condition C, Condition D, Condition D1, Condition D2, Condition D3, Condition D4, Condition E, Condition F, Condition G, Condition H, Condition H1, Condition H2, Condition H3 and/or Condition H4 are met, the UE may handle and/or perform configured transmission and/or configured reception based upon Action 1, Action 2, Action 3, Action 4, Action 5, Action 6, Action 7 and/or Action 8.

In a second embodiment, if a slot format of a slot is not indicated and/or configured by a group common PDCCH for a UE, the UE may determine how to handle and/or perform configured transmission and/or configured reception in a slot. For example, a slot format associated with the slot may not be indicated and/or configured by a group common PDCCH in a monitoring occasion associated with the slot.

It may be appreciated that various examples where a slot format of a slot is not indicated and/or configured by a group common PDCCH for a UE may be contemplated. For example, an example where a slot format of the slot is not indicated and/or configured by the group common PDCCH for the UE may be associated with one or more of the conditions described below. Further, depending on one or more conditions that are met, one or more of the actions described below may be performed in order to handle and/or perform configured transmission and/or configured reception in the slot, wherein one or more actions may be selected and/or performed based upon the one or more conditions.

Condition A may be met if a UE monitors (for) the group common PDCCH in a monitoring occasion associated with the slot and/or the UE does not detect and/or receive the group common PDCCH while monitoring (for) the group common PDCCH in the monitoring occasion (e.g., an example of which is illustrated in FIG. 9 where the DCI 1 is not transmitted by the base station to the UE via the monitoring occasion 915 and/or where the DCI2 is transmitted by the base station to the UE and/or the UE does not receive the DCI 2).

Condition B may be met if a base station does not transmit the group common PDCCH to the UE in a monitoring occasion associated with the slot (e.g., an example of which is illustrated in FIG. 9 where the DCI 1 is not transmitted by the base station to the UE via the monitoring occasion 915).

Condition C may be met if a base station transmits the group common PDCCH to the UE and/or the UE does not (successfully) receive and/or decode the group common PDCCH correctly in a monitoring occasion associated with the slot (e.g., an example of which is illustrated in FIG. 9 where the DCI2 is transmitted by the base station to the UE and/or the UE does not receive the DCI 2).

Condition D may be met if the UE does not monitor (for) the group common PDCCH in a monitoring occasion associated with the slot (e.g., an example of which is illustrated in FIG. 9 where the UE does not perform the monitoring associated with the DCI 3 in the monitoring occasion 925).

Condition D1 may be met if the UE does not monitor (for) the group common PDCCH in a monitoring occasion associated with the slot because one or more symbols (e.g., one symbol, a proportion of symbols, all symbols, etc.) of the slot associated with the monitoring occasion are configured and/or indicated as being UL (symbols) by a previous group common PDCCH in a previous monitoring occasion (e.g., an example of which is illustrated in FIG. 9 where the UE does not perform the monitoring associated with the DCI 3 in the monitoring occasion 925).

Condition D2 may be met if the UE does not monitor (for) the group common PDCCH in a monitoring occasion associated with the slot because one or more symbols (e.g., one symbol, a proportion of symbols, all symbols, etc.) of the slot associated with the monitoring occasion are configured and/or indicated as being flexible (symbols) by a previous group common PDCCH in a previous monitoring occasion (e.g., an example of which is illustrated in FIG. 9 where the UE does not perform the monitoring associated with the DCI 3 in the monitoring occasion 925).

Condition D3 may be met if the UE does not monitor (for) the group common PDCCH in a monitoring occasion associated with the slot because one or more symbols (e.g., one symbol, a proportion of symbols, all symbols, etc.) of the slot associated with the monitoring occasion are configured and/or indicated as being UL (symbols) by a higher layer configuration (e.g., an example of which is illustrated in FIG. 9 where the UE does not perform the monitoring associated with the DCI 3 in the monitoring occasion 925).

Condition D4 may be met if the UE does not monitor (for) the group common PDCCH in a monitoring occasion associated with the slot because one or more symbols (e.g., one symbol, a proportion of symbols, all symbols, etc.) of the slot associated with the monitoring occasion are configured and/or indicated as being flexible (symbols) by a higher layer configuration (e.g., an example of which is illustrated in FIG. 9 where the UE does not perform the monitoring associated with the DCI 3 in the monitoring occasion 925).

Condition E may be met if the UE receives the group common PDCCH and/or the group common PDCCH is not indicative of a slot format associated with the slot (e.g., an example of which is illustrated in FIG. 9 where the DCI 4 is received via the monitoring occasion 930, wherein the DCI 4 is indicative of the slot format combination for the period 905 that is shorter than the monitoring period 955 and/or is not indicative of one or more slot formats of the one or more slots 910).

Condition F may be met if the UE monitors (for) the group common PDCCH in a monitoring occasion associated with the slot, the UE does not detect and/or receive the group common PDCCH while monitoring (for) the group common PDCCH in the monitoring occasion, and/or a previous group common PDCCH, indicative of a slot format associated with the slot, is received in a previous monitoring occasion (e.g., an example of which is illustrated in FIG. 10 where the DCI 2 is not transmitted by the base station and/or is not received by the UE via a monitoring occasion and/or the DCI 1 is received via a previous monitoring occasion and/or is indicative of one or more slot formats associated with the monitoring occasion and/or the period 1005, another example of which is illustrated in FIG. 10 where the DCI 4 is transmitted by the base station and/or is not received by the UE via a monitoring occasion and/or the DCI 3 is received via a previous monitoring occasion and/or is indicative of one or more slot formats associated with the monitoring occasion and/or the period 1020).

Condition G may be met if a base station does not transmit the group common PDCCH to the UE in a monitoring occasion associated with the slot and/or a previous group common PDCCH, indicative of a slot format associated with the slot, is received in a previous monitoring occasion (e.g., an example of which is illustrated in FIG. 10 where the DCI 2 is not transmitted by the base station and/or is not received by the UE via a monitoring occasion and/or the DCI 1 is received via a previous monitoring occasion and/or is indicative of one or more slot formats associated with the monitoring occasion and/or the period 1005).

Condition H may be met if a base station transmits the group common PDCCH to the UE, the UE does not (successfully) receive and/or decode the group common PDCCH correctly in a monitoring occasion associated with the slot and/or a previous group common PDCCH, indicative of a slot format associated with the slot, is received in a previous monitoring occasion (e.g., an example of which is illustrated in FIG. 10 where the DCI 4 is transmitted by the base station and/or is not received by the UE via a monitoring occasion and/or the DCI 3 is received via a previous monitoring occasion and/or is indicative of one or more slot formats associated with the monitoring occasion and/or the period 1020).

Condition I may be met if the UE does not monitor (for) the group common PDCCH in a monitoring occasion associated with the slot and/or a previous group common PDCCH, indicative of a slot format associated with the slot, is received in a previous monitoring occasion (e.g., an example of which is illustrated in FIG. 10 where the DCI 6 is (and/or is not) transmitted by the base station, the UE does not monitor (for) the DCI 6 via a monitoring occasion and/or the DCI 5 is received via a previous monitoring occasion and/or is indicative of one or more slot formats associated with the monitoring occasion and/or the period 1035).

Condition I1 may be met if the UE does not monitor (for) the group common PDCCH in a monitoring occasion associated with the slot and/or a previous group common PDCCH, indicative of one or more symbols (e.g., one symbol, a proportion of symbols, all symbols, etc.) associated with the monitoring occasion as being UL (symbols), is received in a previous monitoring occasion (e.g., an example of which is illustrated in FIG. 10 where the DCI 6 is (and/or is not) transmitted by the base station, the UE does not monitor (for) the DCI 6 via a monitoring occasion and/or the DCI 5 is received via a previous monitoring occasion and/or is indicative of one or more slot formats associated with the monitoring occasion and/or the period 1035).

Condition I2 may be met if the UE does not monitor (for) the group common PDCCH in a monitoring occasion associated with the slot and/or a previous group common PDCCH, indicative of one or more symbols (e.g., one symbol, a proportion of symbols, all symbols, etc.) associated with the monitoring occasion as being flexible (symbols), is received in a previous monitoring occasion (e.g., an example of which is illustrated in FIG. 10 where the DCI 6 is (and/or is not) transmitted by the base station, the UE does not monitor (for) the DCI 6 via a monitoring occasion and/or the DCI 5 is received via a previous monitoring occasion and/or is indicative of one or more slot formats associated with the monitoring occasion and/or the period 1035).

Condition I3 may be met if the UE does not monitor (for) the group common PDCCH in a monitoring occasion associated with the slot and/or a previous group common PDCCH, indicative of a slot format associated with the slot, is received in a previous monitoring occasion, wherein a higher layer configuration is indicative of one or more symbols (e.g., one symbol, a proportion of symbols, all symbols, etc.) associated with the monitoring occasion as being UL (symbols) (e.g., an example of which is illustrated in FIG. 10 where the DCI 6 is (and/or is not) transmitted by the base station, the UE does not monitor (for) the DCI 6 via a monitoring occasion and/or the DCI 5 is received via a previous monitoring occasion and/or is indicative of one or more slot formats associated with the monitoring occasion and/or the period 1035).

Condition I4 may be met if the UE does not monitor (for) the group common PDCCH in a monitoring occasion associated with the slot and/or a previous group common PDCCH, indicative of a slot format associated with the slot, is received in a previous monitoring occasion, wherein a higher layer configuration is indicative of one or more symbols (e.g., one symbol, a proportion of symbols, all symbols, etc.) associated with the monitoring occasion as being flexible (symbols) (e.g., an example of which is illustrated in FIG. 10 where the DCI 6 is (and/or is not) transmitted by the base station, the UE does not monitor (for) the DCI 6 via a monitoring occasion and/or the DCI 5 is received via a previous monitoring occasion and/or is indicative of one or more slot formats associated with the monitoring occasion and/or the period 1035).

Condition J may be met if the UE receives the group common PDCCH and/or the group common PDCCH is not indicative of a slot format associated with the slot and/or a previous group common PDCCH, indicative of a slot format associated with the slot, is received in a previous monitoring occasion (e.g., an example of which is illustrated in FIG. 10 where the DCI 8 is received via a monitoring occasion, wherein the DCI 8 is indicative of one or more slot formats associated with the period 1065 that is shorter than the monitoring period 1060, wherein the DCI 7 is received via a previous monitoring occasion and/or is indicative of one or more slot formats associated with the monitoring occasion and/or the period 1050).

The actions described below may be performed in order to handle and/or perform configured transmission and/or configured reception in the slot.

Action 1 may comprise performing configured transmission on one or more symbols configured as flexible (symbols) by RRC.

Action 2 may comprise performing configured reception on one or more symbols configured as flexible (symbols) by RRC.

Action 3 may comprise not performing configured transmission on one or more symbols configured as flexible (symbols) by RRC.

Action 4 may comprise not performing configured reception on one or more symbols configured as flexible (symbols) by RRC.

Action 5 may comprise not performing configured transmission on one or more symbols configured as flexible (symbols) by RRC and/or performing configured transmission on one or more symbols configured as UL (symbols) by RRC.

Action 6 may comprise not performing configured reception on one or more symbols configured as flexible (symbols) by RRC and/or performing configured reception on one or more symbols configured as DL (symbols) by RRC.

Action 7 may comprise deciding whether to perform configured transmission based upon a previous group common PDCCH received in a previous monitoring occasion.

Action 8 may comprise deciding whether to perform configured reception based upon a previous group common PDCCH received in a previous monitoring occasion.

In an example, if Condition A, Condition B, Condition C, Condition D2 and/or Condition D4 are met, a UE may perform Action 3 and/or Action 4. Alternatively and/or additionally, if Condition D, Condition D1, Condition D2, Condition D3 and/or Condition D4 are met, the UE may perform Action 1 and/or Action 2. Alternatively and/or additionally, if Condition E is met, the UE may perform Action 1 and/or Action 2. For example, if Condition A, Condition B, Condition C, Condition D2 and/or Condition D4 are met, the UE may handle and/or perform configured transmission and/or configured reception based upon Action 3 and/or Action 4. Alternatively and/or additionally, if Condition D, Condition D1, Condition D2, Condition D3 and/or Condition D4 are met, the UE may handle and/or perform configured transmission and/or configured reception based upon Action 1 and/or Action 2. Alternatively and/or additionally, if Condition E is met, the UE may handle and/or perform configured transmission and/or configured reception based upon Action 1 and/or Action 2.

In another example, if Condition A, Condition B, Condition C, Condition D2 and/or Condition D4 are met, a UE may perform Action 5 and/or Action 6. Alternatively and/or additionally, if Condition D, Condition D1, Condition D2, Condition D3 and/or Condition D4 are met, the UE may perform Action 1 and/or Action 2. Alternatively and/or additionally, if Condition E is met, the UE may perform Action 1 and/or Action 2. For example, if Condition A, Condition B, Condition C, Condition D2 and/or Condition D4 are met, the UE may handle and/or perform configured transmission and/or configured reception based upon Action 5 and/or Action 6. Alternatively and/or additionally, if Condition D, Condition D1, Condition D2, Condition D3 and/or Condition D4 are met, the UE may handle and/or perform configured transmission and/or configured reception based upon Action 1 and/or Action 2. Alternatively and/or additionally, if Condition E is met, the UE may handle and/or perform configured transmission and/or configured reception based upon Action 1 and/or Action 2.

In another example, if Condition F, Condition G, Condition H, Condition I2 and/or Condition I4 are met, a UE may perform Action 3 and/or Action 4. Alternatively and/or additionally, if Condition I, Condition I1, Condition I2, Condition I3 and/or Condition I4 are met, the UE may perform Action 7 and/or Action 8. Alternatively and/or additionally, if Condition J is met, the UE may perform Action 7 and/or Action 8. For example, if Condition F, Condition G, Condition H, Condition I2 and/or Condition I4 are met, the UE may handle and/or perform configured transmission and/or configured reception based upon Action 3 and/or Action 4. Alternatively and/or additionally, if Condition I, Condition I1, Condition I2, Condition I3 and/or Condition I4 are met, the UE may handle and/or perform configured transmission and/or configured reception based upon Action 7 and/or Action 8. Alternatively and/or additionally, if Condition J is met, the UE may handle and/or perform configured transmission and/or configured reception based upon Action 7 and/or Action 8.

In another example, if Condition F, Condition G, Condition H, Condition I2 and/or Condition I4 are met, a UE may perform Action 3 and/or Action 4. Alternatively and/or additionally, if Condition I, Condition I1, Condition I2, Condition I3 and/or Condition I4 are met, the UE may perform Action 7 and/or Action 8. Alternatively and/or additionally, if Condition J is met, the UE may perform Action 1 and/or Action 2. For example, Condition F, Condition G, Condition H, Condition I2 and/or Condition I4 are met, the UE may handle and/or perform configured transmission and/or configured reception based upon Action 3 and/or Action 4. Alternatively and/or additionally, if Condition I, Condition I1, Condition I2, Condition I3 and/or Condition I4 are met, the UE may handle and/or perform configured transmission and/or configured reception based upon Action 7 and/or Action 8. Alternatively and/or additionally, if Condition J is met, the UE may handle and/or perform configured transmission and/or configured reception based upon Action 1 and/or Action 2.

In another example, if Condition F, Condition G, Condition H, Condition I2 and/or Condition I4 are met, a UE may perform Action 3 and/or Action 4. Alternatively and/or additionally, if Condition I, Condition I1, Condition I2, Condition I3 and/or Condition I4 are met, the UE may perform Action 1 and/or Action 2. Alternatively and/or additionally, if Condition J is met, the UE may perform Action 1 and/or Action 2. For example, if Condition F, Condition G, Condition H, Condition I2 and/or Condition I4 are met, the UE may handle and/or perform configured transmission and/or configured reception based upon Action 3 and/or Action 4. Alternatively and/or additionally, if Condition I, Condition I1, Condition I2, Condition I3 and/or Condition I4 are met, the UE may handle and/or perform configured transmission and/or configured reception based upon Action 1 and/or Action 2. Alternatively and/or additionally, if Condition J is met, the UE may handle and/or perform configured transmission and/or configured reception based upon Action 1 and/or Action 2.

In another example, if Condition F, Condition G, Condition H, Condition I2 and/or Condition I4 are met, a UE may perform Action 3 and/or Action 4. Alternatively and/or additionally, if Condition I, Condition I1, Condition I2, Condition I3 and/or Condition I4 are met, the UE may perform Action 1 and/or Action 2. Alternatively and/or additionally, if Condition J is met, the UE may perform Action 7 and/or Action 8. For example, if Condition F, Condition G, Condition H, Condition I2 and/or Condition I4 are met, the UE may handle and/or perform configured transmission and/or configured reception based upon Action 3 and/or Action 4. Alternatively and/or additionally, if Condition I, Condition I1, Condition I2, Condition I3 and/or Condition I4 are met, the UE may handle and/or perform configured transmission and/or configured reception based upon Action 1 and/or Action 2. Alternatively and/or additionally, if Condition J is met, the UE may handle and/or perform configured transmission and/or configured reception based upon Action 7 and/or Action 8.

In another example, if Condition F, Condition G, Condition H, Condition I2 and/or Condition I4 are met, a UE may perform Action 5 and/or Action 6. Alternatively and/or additionally, if Condition I, Condition I1, Condition I2 and/or Condition I3 are met, the UE may perform Action 7 and/or Action 8. Alternatively and/or additionally, if Condition J is met, the UE may perform Action 7 and/or Action 8. For example, if Condition F, Condition G, Condition H, Condition I2 and/or Condition I4 are met, the UE may handle and/or perform configured transmission and/or configured reception based upon Action 5 and/or Action 6. Alternatively and/or additionally, if Condition I, Condition I1, Condition I2 and/or Condition I3 are met, the UE may handle and/or perform configured transmission and/or configured reception based upon Action 7 and/or Action 8. Alternatively and/or additionally, if Condition J is met, the UE may handle and/or perform configured transmission and/or configured reception based upon Action 7 and/or Action 8.

In another example, if Condition F, Condition G, Condition H, Condition I2 and/or Condition I4 are met, a UE may perform Action 5 and/or Action 6. Alternatively and/or additionally, if Condition I, Condition I1, Condition I2, Condition I3 and/or Condition I4 are met, the UE may perform Action 7 and/or Action 8. Alternatively and/or additionally, if Condition J is met, the UE may perform Action 1 and/or Action 2. For example, if Condition F, Condition G, Condition H, Condition I2 and/or Condition I4 are met, the UE may handle and/or perform configured transmission and/or configured reception based upon Action 5 and/or Action 6. Alternatively and/or additionally, if Condition I, Condition I1, Condition I2, Condition I3 and/or Condition I4 are met, the UE may handle and/or perform configured transmission and/or configured reception based upon Action 7 and/or Action 8. Alternatively and/or additionally, if Condition J is met, the UE may handle and/or perform configured transmission and/or configured reception based upon Action 1 and/or Action 2.

In another example, if Condition F, Condition G, Condition H, Condition I2 and/or Condition I4 are met, a UE may perform Action 5 and/or Action 6. Alternatively and/or additionally, if Condition I, Condition I1, Condition I2, Condition I3 and/or Condition I4 are met, the UE may perform Action 1 and/or Action 2. Alternatively and/or additionally, if Condition J is met, the UE may perform Action 1 and/or Action 2. For example, if Condition F, Condition G, Condition H, Condition I2 and/or Condition I4 are met, the UE may handle and/or perform configured transmission and/or configured reception based upon Action 5 and/or Action 6. Alternatively and/or additionally, if Condition I, Condition I1, Condition I2, Condition I3 and/or Condition I4 are met, the UE may handle and/or perform configured transmission and/or configured reception based upon Action 1 and/or Action 2. Alternatively and/or additionally, if Condition J is met, the UE may handle and/or perform configured transmission and/or configured reception based upon Action 1 and/or Action 2.

In another example, if Condition F, Condition G, Condition H, Condition I2 and/or Condition I4 are met, a UE may perform Action 5 and/or Action 6. Alternatively and/or additionally, if Condition I, Condition I1, Condition I2, Condition I3 and/or Condition I4 are met, the UE may perform Action 1 and/or Action 2. Alternatively and/or additionally, if Condition J is met, the UE may perform Action 7 and/or Action 8. For example, if Condition F, Condition G, Condition H, Condition I2 and/or Condition I4 are met, the UE may handle and/or perform configured transmission and/or configured reception based upon Action 5 and/or Action 6. Alternatively and/or additionally, if Condition I, Condition I1, Condition I2, Condition I3 and/or Condition I4 are met, the UE may handle and/or perform configured transmission and/or configured reception based upon Action 1 and/or Action 2. Alternatively and/or additionally, if Condition J is met, the UE may handle and/or perform configured transmission and/or configured reception based upon Action 7 and/or Action 8.

In another example, if Condition A, Condition B, Condition C, Condition D2 and/or Condition D4 are met, a UE may perform Action 3 and/or Action 4. Alternatively and/or additionally, if Condition D, Condition D1, Condition D2, Condition D3 and/or Condition D4 are met, the UE may perform Action 1 and/or Action 2. Alternatively and/or additionally, if Condition E is met, the UE may perform Action 1 and/or Action 2. Alternatively and/or additionally, if Condition F, Condition G, Condition H, Condition I2 and/or Condition I4 are met, the UE may perform Action 3 and/or Action 4. Alternatively and/or additionally, if Condition I, Condition I1, Condition I2, Condition I3 and/or Condition I4 are met, the UE may perform Action 7 and/or Action 8. Alternatively and/or additionally, if Condition J is met, the UE may perform Action 7 and/or Action 8. For example, if Condition A, Condition B, Condition C, Condition D2 and/or Condition D4 are met, the UE may handle and/or perform configured transmission and/or configured reception based upon Action 3 and/or Action 4. Alternatively and/or additionally, if Condition D, Condition D1, Condition D2, Condition D3 and/or Condition D4 are met, the UE may handle and/or perform configured transmission and/or configured reception based upon Action 1 and/or Action 2. Alternatively and/or additionally, if Condition E is met, the UE may handle and/or perform configured transmission and/or configured reception based upon Action 1 and/or Action 2. Alternatively and/or additionally, if Condition F, Condition G, Condition H, Condition I2 and/or Condition I4 are met, the UE may handle and/or perform configured transmission and/or configured reception based upon Action 3 and/or Action 4. Alternatively and/or additionally, if Condition I, Condition I1, Condition I2, Condition I3 and/or Condition I4 are met, the UE may handle and/or perform configured transmission and/or configured reception based upon Action 7 and/or Action 8. Alternatively and/or additionally, if Condition J is met, the UE may handle and/or perform configured transmission and/or configured reception based upon Action 7 and/or Action 8.

In another example, if Condition A, Condition B, Condition C, Condition D2 and/or Condition D4 are met, a UE may perform Action 3 and/or Action 4. Alternatively and/or additionally, if Condition D, Condition D1, Condition D2, Condition D3 and/or Condition D4 are met, the UE may perform Action 1 and/or Action 2. Alternatively and/or additionally, if Condition E is met, the UE may perform Action 1 and/or Action 2. Alternatively and/or additionally, if Condition F, Condition G, Condition H, Condition I2 and/or Condition I4 are met, the UE may perform Action 3 and/or Action 4. Alternatively and/or additionally, if Condition I, Condition I1, Condition I2, Condition I3 and/or Condition I4 are met, the UE may perform Action 7 and/or Action 8. Alternatively and/or additionally, if Condition J is met, the UE may perform Action 1 and/or Action 2. For example, if Condition A, Condition B, Condition C, Condition D2 and/or Condition D4 are met, the UE may handle and/or perform configured transmission and/or configured reception based upon Action 3 and/or Action 4. Alternatively and/or additionally, if Condition D, Condition D1, Condition D2, Condition D3 and/or Condition D4 are met, the UE may handle and/or perform configured transmission and/or configured reception based upon Action 1 and/or Action 2. Alternatively and/or additionally, if Condition E is met, the UE may handle and/or perform configured transmission and/or configured reception based upon Action 1 and/or Action 2. Alternatively and/or additionally, if Condition F, Condition G, Condition H, Condition I2 and/or Condition I4 are met, the UE may handle and/or perform configured transmission and/or configured reception based upon Action 3 and/or Action 4. Alternatively and/or additionally, if Condition I, Condition I1, Condition I2, Condition I3 and/or Condition I4 are met, the UE may handle and/or perform configured transmission and/or configured reception based upon Action 7 and/or Action 8. Alternatively and/or additionally, if Condition J is met, the UE may handle and/or perform configured transmission and/or configured reception based upon Action 1 and/or Action 2.

In another example, if Condition A, Condition B, Condition C, Condition D2 and/or Condition D4 are met, a UE may perform Action 5 and/or Action 6. Alternatively and/or additionally, if Condition D, Condition D1, Condition D2, Condition D3 and/or Condition D4 are met, the UE may perform Action 1 and/or Action 2. Alternatively and/or additionally, if Condition E is met, the UE may perform Action 1 and/or Action 2. Alternatively and/or additionally, if Condition F, Condition G, Condition H, Condition I2 and/or Condition I4 are met, the UE may perform Action 5 and/or Action 6. Alternatively and/or additionally, if Condition I, Condition I1, Condition I2, Condition I3 and/or Condition I4 are met, the UE may perform Action 7 and/or Action 8. Alternatively and/or additionally, if Condition J is met, the UE may perform Action 7 and/or Action 8. For example, if Condition A, Condition B, Condition C, Condition D2 and/or Condition D4 are met, the UE may handle and/or perform configured transmission and/or configured reception based upon Action 5 and/or Action 6. Alternatively and/or additionally, if Condition D, Condition D1, Condition D2, Condition D3 and/or Condition D4 are met, the UE may handle and/or perform configured transmission and/or configured reception based upon Action 1 and/or Action 2. Alternatively and/or additionally, if Condition E is met, the UE may handle and/or perform configured transmission and/or configured reception based upon Action 1 and/or Action 2. Alternatively and/or additionally, if Condition F, Condition G, Condition H, Condition I2 and/or Condition I4 are met, the UE may handle and/or perform configured transmission and/or configured reception based upon Action 5 and/or Action 6. Alternatively and/or additionally, if Condition I, Condition I1, Condition I2, Condition I3 and/or Condition I4 are met, the UE may handle and/or perform configured transmission and/or configured reception based upon Action 7 and/or Action 8. Alternatively and/or additionally, if Condition J is met, the UE may handle and/or perform configured transmission and/or configured reception based upon Action 7 and/or Action 8.

In another example, if Condition A, Condition B, Condition C, Condition D2 and/or Condition D4 are met, a UE may perform Action 5 and/or Action 6. Alternatively and/or additionally, if Condition D, Condition D1, Condition D2, Condition D3 and/or Condition D4 are met, the UE may perform Action 1 and/or Action 2. Alternatively and/or additionally, if Condition E is met, the UE may perform Action 1 and/or Action 2. Alternatively and/or additionally, if Condition F, Condition G, Condition H, Condition I2 and/or Condition I4 are met, the UE may perform Action 5 and/or Action 6. Alternatively and/or additionally, if Condition I, Condition I1, Condition I2, Condition I3 and/or Condition I4 are met, the UE may perform Action 7 and/or Action 8. Alternatively and/or additionally, if Condition J is met, the UE may perform Action 1 and/or Action 2. For example, if Condition A, Condition B, Condition C, Condition D2 and/or Condition D4 are met, the UE may handle and/or perform configured transmission and/or configured reception based upon Action 5 and/or Action 6. Alternatively and/or additionally, if Condition D, Condition D1, Condition D2, Condition D3 and/or Condition D4 are met, the UE may handle and/or perform configured transmission and/or configured reception based upon Action 1 and/or Action 2. Alternatively and/or additionally, if Condition E is met, the UE may handle and/or perform configured transmission and/or configured reception based upon Action 1 and/or Action 2. Alternatively and/or additionally, if Condition F, Condition G, Condition H, Condition I2 and/or Condition I4 are met, the UE may handle and/or perform configured transmission and/or configured reception based upon Action 5 and/or Action 6. Alternatively and/or additionally, if Condition I, Condition I1, Condition I2, Condition I3 and/or Condition I4 are met, the UE may handle and/or perform configured transmission and/or configured reception based upon Action 7 and/or Action 8. Alternatively and/or additionally, if Condition J is met, the UE may handle and/or perform configured transmission and/or configured reception based upon Action 1 and/or Action 2.

In another example, if Condition A, Condition B, Condition C, Condition D2 and/or Condition D4 are met, a UE may perform Action 3 and/or Action 4. Alternatively and/or additionally, if Condition D, Condition D1, Condition D2, Condition D3 and/or Condition D4 are met, the UE may perform Action 1 and/or Action 2. Alternatively and/or additionally, if Condition E is met, the UE may perform Action 1 and/or Action 2. Alternatively and/or additionally, if Condition F, Condition G, Condition H, Condition I2 and/or Condition I4 are met, the UE may perform Action 3 and/or Action 4. Alternatively and/or additionally, if Condition I, Condition I1, Condition I2, Condition I3 and/or Condition I4 are met, the UE may perform Action 1 and/or Action 2. Alternatively and/or additionally, if Condition J is met, the UE may perform Action 1 and/or Action 2. For example, if Condition A, Condition B, Condition C, Condition D2 and/or Condition D4 are met, the UE may handle and/or perform configured transmission and/or configured reception based upon Action 3 and/or Action 4. Alternatively and/or additionally, if Condition D, Condition D1, Condition D2, Condition D3 and/or Condition D4 are met, the UE may handle and/or perform configured transmission and/or configured reception based upon Action 1 and/or Action 2. Alternatively and/or additionally, if Condition E is met, the UE may handle and/or perform configured transmission and/or configured reception based upon Action 1 and/or Action 2. Alternatively and/or additionally, if Condition F, Condition G, Condition H, Condition I2 and/or Condition I4 are met, the UE may handle and/or perform configured transmission and/or configured reception based upon Action 3 and/or Action 4. Alternatively and/or additionally, if Condition I, Condition I1, Condition I2, Condition I3 and/or Condition I4 are met, the UE may handle and/or perform configured transmission and/or configured reception based upon Action 1 and/or Action 2. Alternatively and/or additionally, if Condition J is met, the UE may handle and/or perform configured transmission and/or configured reception based upon Action 1 and/or Action 2.

In another example, if Condition A, Condition B, Condition C, Condition D2 and/or Condition D4 are met, a UE may perform Action 3 and/or Action 4. Alternatively and/or additionally, if Condition D, Condition D1, Condition D2, Condition D3 and/or Condition D4 are met, the UE may perform Action 1 and/or Action 2. Alternatively and/or additionally, if Condition E is met, the UE may perform Action 1 and/or Action 2. Alternatively and/or additionally, if Condition F, Condition G, Condition H, Condition I2 and/or Condition I4 are met, the UE may perform Action 3 and/or Action 4. Alternatively and/or additionally, if Condition I, Condition I1, Condition I2, Condition I3 and/or Condition I4 are met, the UE may perform Action 1 and/or Action 2. Alternatively and/or additionally, if Condition J is met, the UE may perform Action 7 and/or Action 8. For example, if Condition A, Condition B, Condition C, Condition D2 and/or Condition D4 are met, the UE may handle and/or perform configured transmission and/or configured reception based upon Action 3 and/or Action 4. Alternatively and/or additionally, if Condition D, Condition D1, Condition D2, Condition D3 and/or Condition D4 are met, the UE may handle and/or perform configured transmission and/or configured reception based upon Action 1 and/or Action 2. Alternatively and/or additionally, if Condition E is met, the UE may handle and/or perform configured transmission and/or configured reception based upon Action 1 and/or Action 2. Alternatively and/or additionally, if Condition F, Condition G, Condition H, Condition I2 and/or Condition I4 are met, the UE may handle and/or perform configured transmission and/or configured reception based upon Action 3 and/or Action 4. Alternatively and/or additionally, if Condition I, Condition I1, Condition I2, Condition I3 and/or Condition I4 are met, the UE may handle and/or perform configured transmission and/or configured reception based upon Action 1 and/or Action 2. Alternatively and/or additionally, if Condition J is met, the UE may handle and/or perform configured transmission and/or configured reception based upon Action 7 and/or Action 8.

In another example, if Condition A, Condition B, Condition C, Condition D2 and/or Condition D4 are met, a UE may perform Action 5 and/or Action 6. Alternatively and/or additionally, if Condition D, Condition D1, Condition D2, Condition D3 and/or Condition D4 are met, the UE may perform Action 1 and/or Action 2. Alternatively and/or additionally, if Condition E is met, the UE may perform Action 1 and/or Action 2. Alternatively and/or additionally, if Condition F, Condition G, Condition H, Condition I2 and/or Condition I4 are met, the UE may perform Action 5 and/or Action 6. Alternatively and/or additionally, if Condition I, Condition I1, Condition I2, Condition I3 and/or Condition I4 are met, the UE may perform Action 1 and/or Action 2. Alternatively and/or additionally, if Condition J is met, the UE may perform Action 1 and/or Action 2. For example, if Condition A, Condition B, Condition C, Condition D2 and/or Condition D4 are met, the UE may handle and/or perform configured transmission and/or configured reception based upon Action 5 and/or Action 6. Alternatively and/or additionally, if Condition D, Condition D1, Condition D2, Condition D3 and/or Condition D4 are met, the UE may handle and/or perform configured transmission and/or configured reception based upon Action 1 and/or Action 2. Alternatively and/or additionally, if Condition E is met, the UE may handle and/or perform configured transmission and/or configured reception based upon Action 1 and/or Action 2. Alternatively and/or additionally, if Condition F, Condition G, Condition H, Condition I2 and/or Condition I4 are met, the UE may handle and/or perform configured transmission and/or configured reception based upon Action 5 and/or Action 6. Alternatively and/or additionally, if Condition I, Condition I1, Condition I2, Condition I3 and/or Condition I4 are met, the UE may handle and/or perform configured transmission and/or configured reception based upon Action 1 and/or Action 2. Alternatively and/or additionally, if Condition J is met, the UE may handle and/or perform configured transmission and/or configured reception based upon Action 1 and/or Action 2.

In another example, if Condition A, Condition B, Condition C, Condition D2 and/or Condition D4 are met, a UE may perform Action 5 and/or Action 6. Alternatively and/or additionally, if Condition D, Condition D1, Condition D2, Condition D3 and/or Condition D4 are met, the UE may perform Action 1 and/or Action 2. Alternatively and/or additionally, if Condition E is met, the UE may perform Action 1 and/or Action 2. Alternatively and/or additionally, if Condition F, Condition G, Condition H, Condition I2 and/or Condition I4 are met, the UE may perform Action 5 and/or Action 6. Alternatively and/or additionally, if Condition I, Condition I1, Condition I2, Condition I3 and/or Condition I4 are met, the UE may perform Action 1 and/or Action 2. Alternatively and/or additionally, if Condition J is met, the UE may perform Action 1 and/or Action 2. For example, if Condition A, Condition B, Condition C, Condition D2 and/or Condition D4 are met, the UE may handle and/or perform configured transmission and/or configured reception based upon Action 7 and/or Action 8. Alternatively and/or additionally, if Condition D, Condition D1, Condition D2, Condition D3 and/or Condition D4 are met, the UE may handle and/or perform configured transmission and/or configured reception based upon Action 1 and/or Action 2. Alternatively and/or additionally, if Condition E is met, the UE may handle and/or perform configured transmission and/or configured reception based upon Action 1 and/or Action 2. Alternatively and/or additionally, if Condition F, Condition G, Condition H, Condition I2 and/or Condition I4 are met, the UE may handle and/or perform configured transmission and/or configured reception based upon Action 5 and/or Action 6. Alternatively and/or additionally, if Condition I, Condition I1, Condition I2, Condition I3 and/or Condition I4 are met, the UE may handle and/or perform configured transmission and/or configured reception based upon Action 1 and/or Action 2. Alternatively and/or additionally, if Condition J is met, the UE may handle and/or perform configured transmission and/or configured reception based upon Action 7 and/or Action 8.

In another example, if Condition A, Condition B, Condition C, Condition D, Condition D1, Condition D2, Condition D3, Condition D4, Condition E, Condition F, Condition G, Condition H, Condition I, Condition I1, Condition I2, Condition I3, Condition I4 and/or Condition J are met, a UE may perform Action 1, Action 2, Action 3, Action 4, Action 5, Action 6, Action 7 and/or Action 8. For example, if Condition A, Condition B, Condition C, Condition D, Condition D1, Condition D2, Condition D3, Condition D4, Condition E, Condition F, Condition G, Condition H, Condition I, Condition I1, Condition I2, Condition I3, Condition I4 and/or Condition J are met, the UE may handle and/or perform configured transmission and/or configured reception based upon Action 1, Action 2, Action 3, Action 4, Action 5, Action 6, Action 7 and/or Action 8.

In a third embodiment, a UE may perform configured reception and/or configured transmission on one or more semi-static configured flexible symbols within a monitoring period associated with a monitoring occasion if the UE skips monitoring (for) a group common PDCCH in the monitoring occasion. For example, the UE may skip monitoring (for) the group common PDCCH in the monitoring occasion because of a (configured) slot format for the monitoring occasion. Alternatively and/or additionally, the UE may not perform configured reception and/or configured transmission on one or more semi-static configured flexible symbols within a monitoring period associated with a monitoring occasion if the UE monitors (for) a group common PDCCH in the monitoring occasion while a group common PDCCH is not received.

In some examples, the UE may receive a (previous) group common PDCCH, indicative of a slot format for the slot, in a previous monitoring occasion. Alternatively and/or additionally, the UE may skip monitoring (for) a group common PDCCH in the monitoring occasion because one or more symbols (e.g., one symbol, a proportion of symbols, all symbols, etc.) in the monitoring occasion are indicated and/or configured as being UL (symbols). Alternatively and/or additionally, the UE may skip monitoring (for) a group common PDCCH in the monitoring occasion because one or more symbols (e.g., one symbol, a proportion of symbols, all symbols, etc.) in the monitoring occasion are indicated and/or configured as being flexible (symbols).

In some examples, one or more symbols (e.g., one symbol, a proportion of symbols, all symbols, etc.) in the monitoring occasion may be indicated and/or configured as being UL (symbols). Alternatively and/or additionally, one or more symbols (e.g., one symbol, a proportion of symbols, all symbols, etc.) in the monitoring occasion may be indicated and/or configured as being flexible (symbols).

In some examples, the UE may not perform configured reception and/or configured transmission on one or more semi-static configured flexible symbols within a monitoring period associated with a monitoring occasion if the UE skips monitoring (for) a group common PDCCH in the monitoring occasion and/or if one or more symbols (e.g., one symbol, a proportion of symbols, all symbols, etc.) in the monitoring occasion are indicated and/or configured as being flexible (symbols). Alternatively and/or additionally, a (previous) group common PDCCH in a previous monitoring occasion may be indicative of one or more symbols (e.g., one symbol, a proportion of symbols, all symbols, etc.) in the monitoring occasion as being flexible (symbols). Alternatively and/or additionally, a (previous) group common PDCCH in a previous monitoring occasion may be indicative of one or more symbols (e.g., one symbol, a proportion of symbols, all symbols, etc.) in the monitoring occasion as being UL (symbols). Alternatively and/or additionally, a higher layer configuration may be indicative of one or more symbols (e.g., one symbol, a proportion of symbols, all symbols, etc.) in the monitoring occasion as being flexible (symbols). Alternatively and/or additionally, a higher layer configuration may be indicative of one or more symbols (e.g., one symbol, a proportion of symbols, all symbols, etc.) in the monitoring occasion as being UL (symbols).

In some examples, if the UE does not receive a group common PDCCH in a monitoring occasion, the UE may determine whether to perform configured transmission and/or configured reception on semi-static configured flexible symbols based upon whether the UE monitors (for) a group common PDCCH in the monitoring occasion. In some examples, the semi-static configured flexible symbols may be within one or more slots associated with the monitoring occasion. Alternatively and/or additionally, the one or more slots associated with the monitoring occasion may be within a monitoring period after the monitoring occasion. Alternatively and/or additionally, the monitoring period may be a monitoring period of a group common PDCCH. Alternatively and/or additionally, the UE may determine to perform configured transmission and/or configured reception on semi-static configured flexible symbols if the UE does not monitor (for) a group common PDCCH in the monitoring occasion. Alternatively and/or additionally, the UE may determine not to perform configured transmission and/or configured reception on semi-static configured flexible symbols if the UE monitors (for) a group common PDCCH in the monitoring occasion.

In a fourth embodiment, a UE may not receive a group common PDCCH in a first monitoring occasion indicative of a slot format for a slot and/or the UE may determine whether to perform configured transmission and/or configured reception on one or more semi-static configured flexible symbols in the slot. In some examples, if the UE receives a group common PDCCH in the first monitoring occasion and/or if the group common PDCCH is not indicative of a slot format of the slot, the UE may perform configured transmission and/or configured reception on one or more semi-static configured flexible symbols in the slot.

Alternatively and/or additionally, if the UE does not receive a group common PDCCH in the first monitoring occasion, the UE may not perform configured transmission and/or configured reception on one or more semi-static configured flexible symbols in the slot.

In some examples, if the UE does not monitor (for) a group common PDCCH in the first monitoring occasion, the UE may perform configured transmission and/or configured reception on one or more semi-static configured flexible symbols in the slot. Alternatively and/or additionally, one or more symbols (e.g., one symbol, a proportion of symbols, all symbols, etc.) in the first monitoring occasion may be indicated and/or configured as being UL (symbols). Alternatively and/or additionally, one or more symbols (e.g., one symbol, a proportion of symbols, all symbols, etc.) in the first monitoring occasion may be indicated and/or configured as being flexible (symbols).

Alternatively and/or additionally, a group common PDCCH in a second monitoring occasion may be indicative of one or more symbols (e.g., one symbol, a proportion of symbols, all symbols, etc.) in the monitoring occasion as being flexible (symbols). Alternatively and/or additionally, the group common PDCCH in the second monitoring occasion may be indicative of one or more symbols (e.g., one symbol, a proportion of symbols, all symbols, etc.) in the monitoring occasion as being UL (symbols). Alternatively and/or additionally, the second monitoring occasion may precede (and/or may be before) the first monitoring occasion.

Alternatively and/or additionally, a higher layer configuration may be indicative of one or more symbols (e.g., one symbol, a proportion of symbols, all symbols, etc.) in the monitoring occasion as being flexible (symbols). Alternatively and/or additionally, the higher layer configuration may be indicative of one or more symbols (e.g., one symbol, a proportion of symbols, all symbols, etc.) in the monitoring occasion as being UL (symbols).

In a fifth embodiment, a UE may receive a first group common PDCCH, indicative of a slot format for a slot, in a first monitoring occasion, and/or the UE may not receive a group common PDCCH in a second monitoring occasion. The UE may determine whether to perform configured transmission and/or configured reception on one or more semi-static configured flexible symbols in the slot based upon whether the UE monitors (for) a group common PDCCH in the second monitoring occasion.

In some examples, if the UE monitors (for) a group common PDCCH in the second monitoring occasion, the UE may not perform configured transmission and/or configured reception on one or more semi-static configured flexible symbols in the slot. Alternatively and/or additionally, if the UE does not monitor (for) a group common PDCCH in the second monitoring occasion, the UE may perform configured transmission and/or configured reception on one or more semi-static configured flexible symbols in the slot.

In some examples, if the UE does not monitor (for) a group common PDCCH in the second monitoring occasion, UE may determine whether to perform configured transmission and/or configured reception on one or more semi-static configured flexible symbols in the slot based upon a slot format indicated by the first group common PDCCH in the first monitoring occasion. Alternatively and/or additionally, the UE may perform configured transmission on one or more semi-static configured flexible symbols in the slot if the one or more semi-static configured flexible symbols are indicated and/or configured as being UL (symbols) by the first group common PDCCH in the first monitoring occasion. Alternatively and/or additionally, the UE may perform configured reception on one or more semi-static configured flexible symbols in the slot if the one or more semi-static configured flexible symbols are indicated and/or configured as being DL (symbols) by the first group common PDCCH in the first monitoring occasion.

Alternatively and/or additionally, the UE may not perform configured reception on one or more semi-static configured flexible symbols in the slot if the one or more semi-static configured flexible symbols are indicated and/or configured as being UL (symbols) by the first group common PDCCH in the first monitoring occasion.

Alternatively and/or additionally, the UE may not perform configured reception on one or more semi-static configured flexible symbols in the slot if the one or more semi-static configured flexible symbols are indicated and/or configured as being flexible (symbols) by the first group common PDCCH in the first monitoring occasion.

Alternatively and/or additionally, the UE may not perform configured reception on one or more semi-static configured flexible symbols in the slot if the one or more semi-static configured flexible symbols are indicated and/or configured as being DL (symbols) by the first group common PDCCH in the first monitoring occasion.

Alternatively and/or additionally, the UE may not perform configured transmission on one or more semi-static configured flexible symbols in the slot if the one or more semi-static configured flexible symbols are indicated and/or configured as being UL (symbols) by the first group common PDCCH in the first monitoring occasion.

Alternatively and/or additionally, the UE may not perform configured transmission on one or more semi-static configured flexible symbols in the slot if the one or more semi-static configured flexible symbols are indicated and/or configured as being flexible (symbols) by the first group common PDCCH in the first monitoring occasion.

Alternatively and/or additionally, the UE may not perform configured transmission on one or more semi-static configured flexible symbols in the slot if the one or more semi-static configured flexible symbols are indicated and/or configured as being DL (symbols) by the first group common PDCCH in the first monitoring occasion.

In some examples, each of the first embodiment, the second embodiment, the third embodiment, the fourth embodiment and the fifth embodiment, may be implemented independently and/or separately. Alternatively and/or additionally, a combination of one or more of the first embodiment, the second embodiment, the third embodiment, the fourth embodiment and/or the fifth embodiment may be implemented.

It may be appreciated that a UE (as used herein) may be replaced with a transmitter. For example, one or more techniques presented herein that are described as applying to a UE may (also) be applied to a transmitter.

Alternatively and/or additionally, a UE (as used herein) may be replaced with a receiver. For example, one or more techniques presented herein that are described as applying to a UE may (also) be applied to a receiver.

Alternatively and/or additionally, a UE (as used herein) may be replaced with a base station. For example, one or more techniques presented herein that are described as applying to a UE may (also) be applied to a base station.

Alternatively and/or additionally, a UE (as used herein) may be replaced with a device being scheduled. For example, one or more techniques presented herein that are described as applying to a UE may (also) be applied to a device being scheduled.

Alternatively and/or additionally, a base station (as used herein) may be replaced with a transmitter. For example, one or more techniques presented herein that are described as applying to a base station may (also) be applied to a transmitter.

Alternatively and/or additionally, a base station (as used herein) may be replaced with a receiver. For example, one or more techniques presented herein that are described as applying to a base station may (also) be applied to a receiver.

Alternatively and/or additionally, a base station (as used herein) may be replaced with a UE. For example, one or more techniques presented herein that are described as applying to a base station may (also) be applied to a UE.

Alternatively and/or additionally, a base station (as used herein) may be replaced with a scheduler. For example, one or more techniques presented herein that are described as applying to a base station may (also) be applied to a scheduler.

It may be appreciated that techniques presented herein may be applied to various types of links (associated with communication, scheduling, etc.) and are not limited to a link between a base station and a UE. For examples, one or more techniques presented herein may be applied to a backhaul link and/or a fronthaul link (e.g., among multiple base stations and/or network points), side link and/or UU link (e.g., among multiple UEs), etc.

Alternatively and/or additionally, a (physical) data channel (as used herein) may refer to a (physical) downlink data channel, an (physical) uplink data channel and/or both a (physical) downlink data channel and an (physical) uplink data channel.

Figure 11:
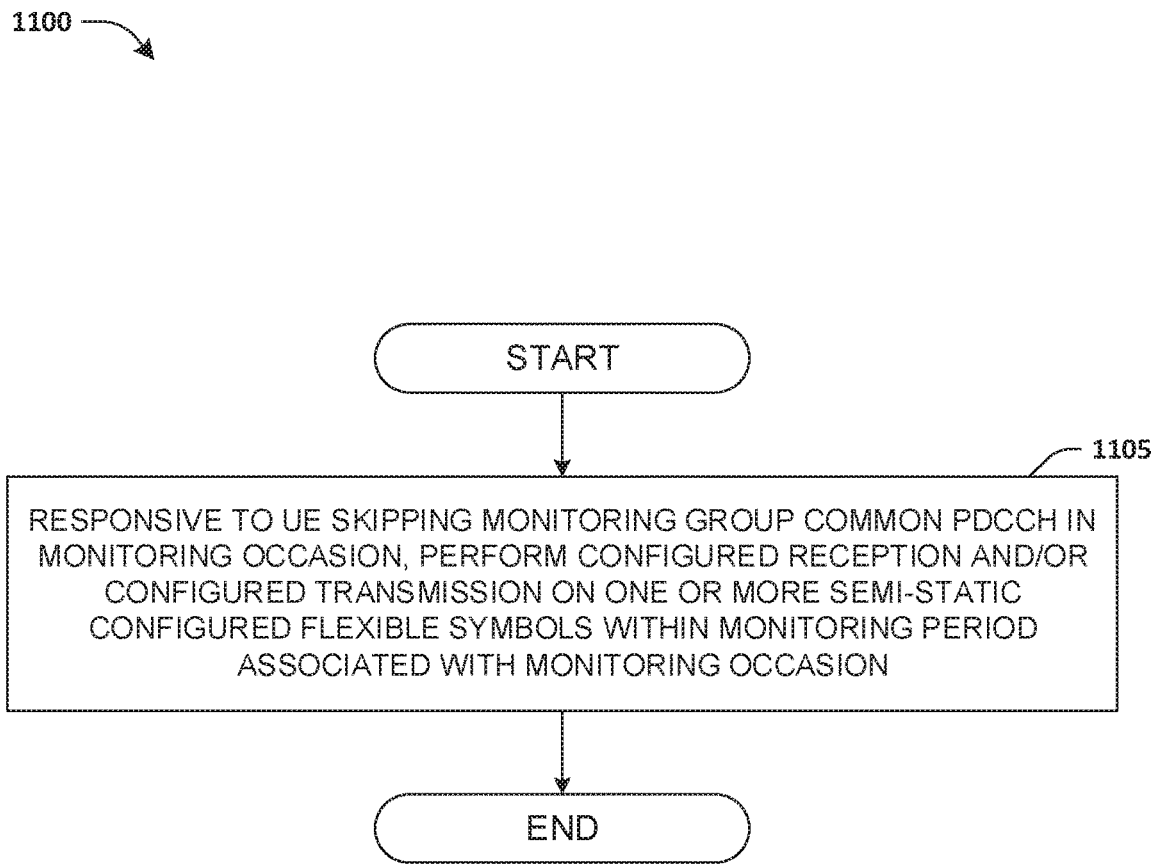
FIG. 11 is a flow chart according to one exemplary embodiment.

FIG. 11 is a flow chart 1100 according to one exemplary embodiment from the perspective of a UE. In step 1105, responsive to a UE skipping monitoring (for) a group common PDCCH in a monitoring occasion, performing configured reception and/or configured transmission on one or more semi-static configured flexible symbols within a monitoring period (e.g., a monitoring periodicity) associated with the monitoring occasion.

In the context of the embodiment illustrated in FIG. 11 and discussed above, the UE may skip monitoring (for) a group common PDCCH in the monitoring occasion based upon (and/or because of) a (configured) slot format for the monitoring occasion.

Alternatively and/or additionally, the UE may not perform configured reception and/or configured transmission on the one or more semi-static configured flexible symbols within the monitoring period associated with the monitoring occasion if the UE monitors (for) a group common PDCCH in the monitoring occasion (and/or a group common PDCCH is not received in the monitoring occasion).

Alternatively and/or additionally, a first group common PDCCH, indicative of a slot format for a slot associated with the monitoring occasion, may be received in a second monitoring occasion.

Alternatively and/or additionally, the UE may skip monitoring (for) a group common PDCCH in the monitoring occasion because one or more symbols (e.g., one symbol, a proportion of symbols, all symbols, etc.) in the monitoring occasion are indicated and/or configured as being UL (symbols). Alternatively and/or additionally, the UE may skip monitoring (for) a group common PDCCH in the monitoring occasion because one or more symbols (e.g., one symbol, a proportion of symbols, all symbols, etc.) in the monitoring occasion are indicated and/or configured as being flexible (symbols).

In some examples, one or more symbols (e.g., one symbol, a proportion of symbols, all symbols, etc.) in the monitoring occasion may be indicated and/or configured as being UL (symbols). Alternatively and/or additionally, one or more symbols (e.g., one symbol, a proportion of symbols, all symbols, etc.) in the monitoring occasion may be indicated and/or configured as being flexible (symbols).

Alternatively and/or additionally, the UE may not perform configured reception and/or configured transmission on the one or more semi-static configured flexible symbols within the monitoring period associated with the monitoring occasion if the UE skips monitoring (for) the group common PDCCH in the monitoring occasion and/or one or more symbols (e.g., one symbol, a proportion of symbols, all symbols, etc.) in the monitoring occasion are indicated and/or configured as being flexible (symbols). Alternatively and/or additionally, a first group common PDCCH in a second monitoring occasion may be indicative of one or more symbols (e.g., one symbol, a proportion of symbols, all symbols, etc.) in the monitoring occasion as being flexible (symbols). Alternatively and/or additionally, the first group common PDCCH in the second monitoring occasion may be indicative of one or more symbols (e.g., one symbol, a proportion of symbols, all symbols, etc.) in the monitoring occasion as being UL (symbols). Alternatively and/or additionally, a higher layer configuration may be indicative of one or more symbols (e.g., one symbol, a proportion of symbols, all symbols, etc.) in the monitoring occasion as being flexible (symbols). Alternatively and/or additionally, the higher layer configuration may be indicative of one or more symbols (e.g., one symbol, a proportion of symbols, all symbols, etc.) in the monitoring occasion as being UL (symbols).

Figure 12:
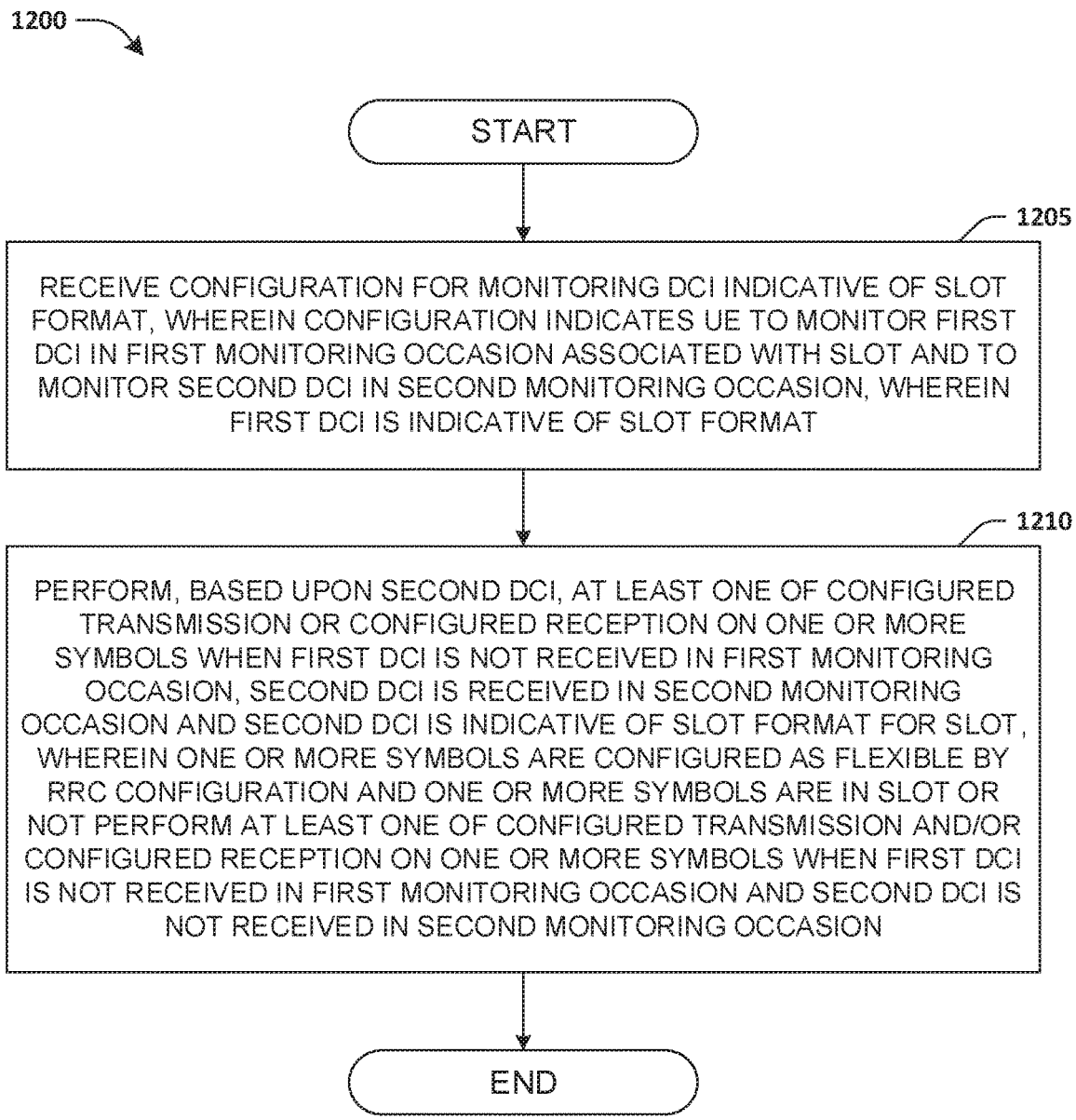
FIG. 12 is a flow chart according to one exemplary embodiment.

FIG. 12 is a flow chart 1200 according to one exemplary embodiment from the perspective of a UE. In step 1205, a configuration for monitoring DCI indicative of a slot format may be received, wherein the configuration indicates (e.g., instructs) the UE to monitor a first DCI in a first monitoring occasion associated with a slot and to monitor a second DCI in a second monitoring occasion, wherein the first DCI is indicative of the slot format. In step 1210, configured transmission and/or configured reception may be performed on one or more symbols when (e.g., if and/or responsive to an instance where) the first DCI is not received in the first monitoring occasion, the second DCI is received in the second monitoring occasion and the second DCI is indicative of the slot format for the slot, wherein the one or more symbols are configured as flexible by an RRC configuration and the one or more symbols are in the slot. Alternatively and/or additionally, at least one of configured transmission and/or configured reception may not be performed on the one or more symbols when (e.g., if and/or responsive to an instance where) the first DCI is not received in the first monitoring occasion and the second DCI is not received in the second monitoring occasion.

Referring back to FIGS. 3 and 4, in one exemplary embodiment of a UE, the device 300 includes a program code 312 stored in the memory 310. The CPU 308 may execute program code 312 (i), to receive a configuration for monitoring DCI indicative of a slot format, wherein the configuration indicates (e.g., instructs) the UE to monitor a first DCI in a first monitoring occasion associated with a slot and to monitor a second DCI in a second monitoring occasion, wherein the first DCI is indicative of the slot format, and one of (ii) to perform, based upon the second DCI, at least one of configured transmission or configured reception on one or more symbols when (e.g., if and/or responsive to an instance where) the first DCI is not received in the first monitoring occasion, the second DCI is received in the second monitoring occasion and the second DCI is indicative of the slot format for the slot, wherein the one or more symbols are configured as flexible by an RRC configuration and the one or more symbols are in the slot, or (iii) to not perform configured transmission and/or configured reception on the one or more symbols when (e.g., if and/or responsive to an instance where) the first DCI is not received in the first monitoring occasion and the second DCI is not received in the second monitoring occasion. Furthermore, the CPU 308 can execute the program code 312 to perform some and/or all of the above-described actions and steps and/or others described herein.

In the context of the embodiment illustrated in FIG. 12 and discussed above, the first monitoring occasion may be a monitoring occasion associated with DCI format 2_0 and/or the second monitoring occasion may be a monitoring occasion associated with DCI format 2_0. Alternatively and/or additionally, the first monitoring occasion may precede (and/or may be before) the second monitoring occasion. Alternatively and/or additionally, the first monitoring occasion and the second monitoring occasion may be separated by a monitoring period (e.g., a monitoring periodicity) associated with DCI format 2_0. Alternatively and/or additionally, the first DCI may be associated with DCI format 2_0 and/or the second DCI may be associated with DCI format 2_0.

Alternatively and/or additionally, the first DCI may be monitored for in the first monitoring occasion.

Alternatively and/or additionally, the first DCI may not be monitored for in the first monitoring occasion when (e.g., if and/or responsive to an instance where) one or more second symbols in the slot (e.g., a portion of symbols in the slot, all symbols in the slot and/or one symbol in the slot) are set to at least one of flexible or uplink (symbols).

Alternatively and/or additionally, the second DCI is not received in the second monitoring occasion when (e.g., if and/or responsive to an instance where) there is not a DCI indicative of the slot format in the second monitoring occasion.

Alternatively and/or additionally, the second DCI is not received in the second monitoring occasion when (e.g., if and/or responsive to an instance where) there is a third DCI, indicative of a second slot format for a second slot, in the second monitoring occasion and the third DCI is not indicative of the slot format for the slot.

Alternatively and/or additionally, the UE may not detect a fourth DCI indicating (e.g., instructing) the UE to perform transmission and/or reception on the one or more symbols.

Figure 13:
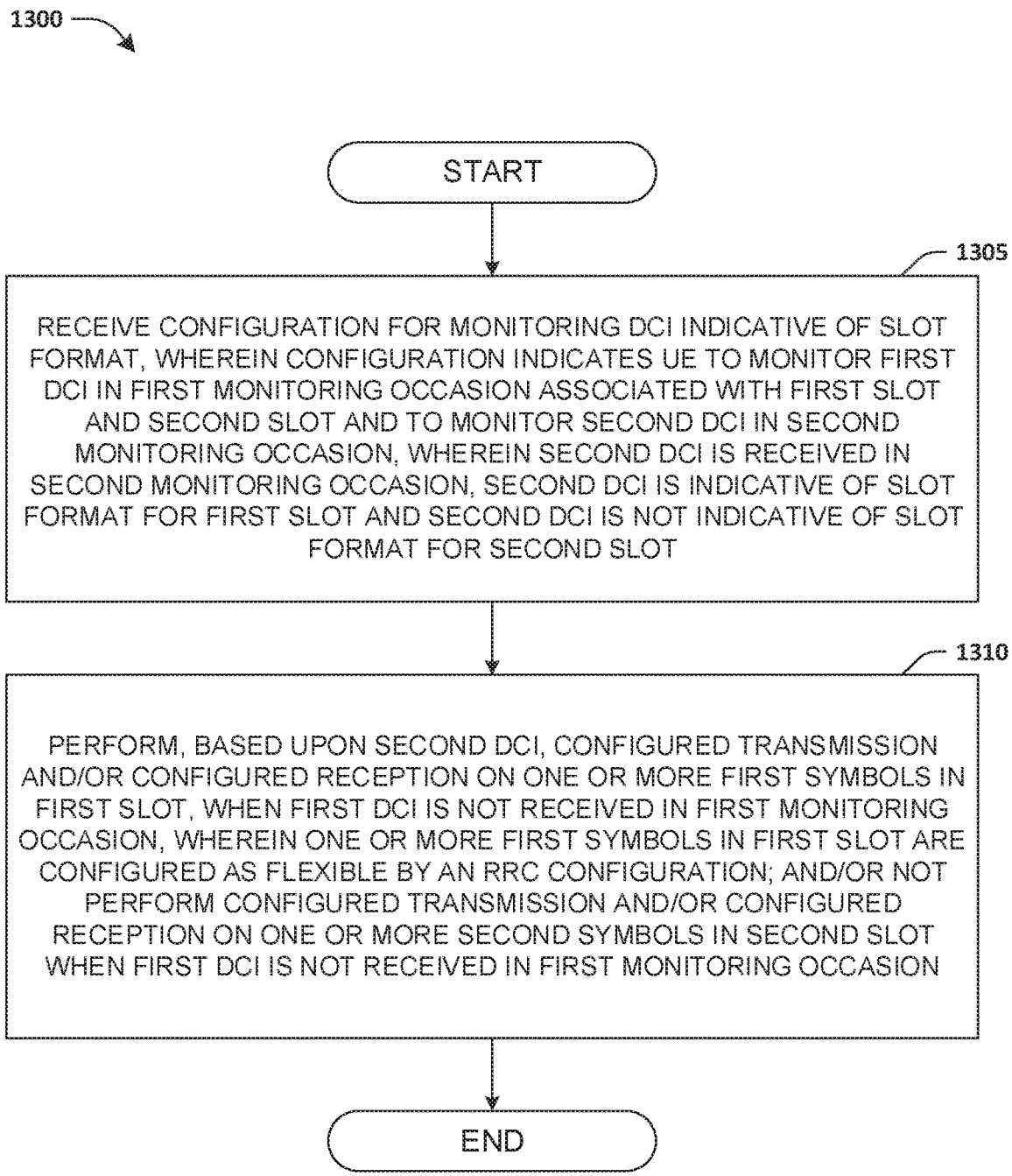
FIG. 13 is a flow chart according to one exemplary embodiment.

FIG. 13 is a flow chart 1300 according to one exemplary embodiment from the perspective of a UE. In step 1305, a configuration for monitoring DCI indicative of a slot format may be received, wherein the configuration indicates (e.g., instructs) the UE to monitor a first DCI in a first monitoring occasion associated with a first slot and a second slot and to monitor a second DCI in a second monitoring occasion, wherein the second DCI is received in the second monitoring occasion, the second DCI is indicative of a slot format for the first slot and the second DCI is not indicative of a slot format for the second slot. In step 1310, configured transmission and/or configured reception may be performed on one or more first symbols in the first slot, based upon the second DCI, when (e.g., if and/or responsive to an instance where) the first DCI is not received in the first monitoring occasion, wherein the one or more first symbols in the first slot are configured as flexible by an RRC configuration. Alternatively and/or additionally, configured transmission and/or configured reception may not be performed on one or more second symbols in the second slot when (e.g., if and/or responsive to an instance where) the first DCI is not received in the first monitoring occasion.

Referring back to FIGS. 3 and 4, in one exemplary embodiment of a UE, the device 300 includes a program code 312 stored in the memory 310. The CPU 308 may execute program code 312 (i), to receive a configuration for monitoring DCI indicative of a slot format, wherein the configuration indicates (e.g., instructs) the UE to monitor a first DCI in a first monitoring occasion associated with a first slot and a second slot and to monitor a second DCI in a second monitoring occasion, wherein the second DCI is received in the second monitoring occasion, the second DCI is indicative of a slot format for the first slot and the second DCI is not indicative of a slot format for the second slot, and at least one of (ii) to perform, based upon the second DCI, configured transmission and/or configured reception on one or more first symbols in the first slot when (e.g., if and/or responsive to an instance where) the first DCI is not received in the first monitoring occasion, wherein the one or more first symbols in the first slot are configured as flexible by an RRC configuration, or (iii) to not perform configured transmission and/or configured reception on one or more second symbols in the second slot when (e.g., if and/or responsive to an instance where) the first DCI is not received in the first monitoring occasion, wherein the one or more second symbols in the second slot are configured as flexible by the RRC configuration. Furthermore, the CPU 308 can execute the program code 312 to perform some and/or all of the above-described actions and steps and/or others described herein.

In the context of the embodiment illustrated in FIG. 13 and discussed above, the first monitoring occasion may be a monitoring occasion associated with DCI format 2_0 and/or the second monitoring occasion may be a monitoring occasion associated with DCI format 2_0. Alternatively and/or additionally, the first monitoring occasion may precede (and/or may be before) the second monitoring occasion. Alternatively and/or additionally, the first monitoring occasion and the second monitoring occasion may be separated by a monitoring period (e.g., a monitoring periodicity) associated with DCI format 2_0. Alternatively and/or additionally, the first DCI may be associated with DCI format 2_0 and/or the second DCI may be associated with DCI format 2_0.

Figure 14:
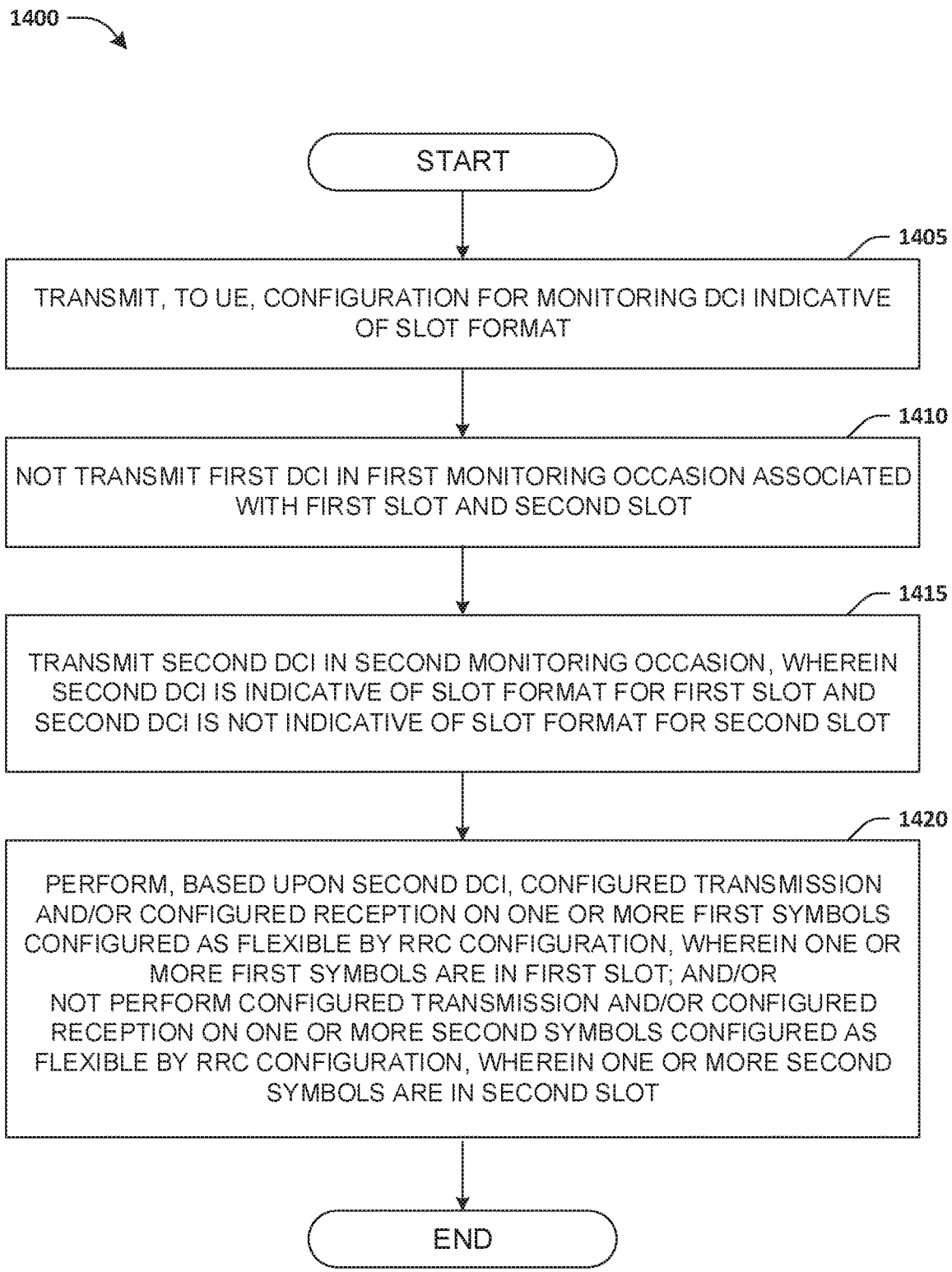
FIG. 14 is a flow chart according to one exemplary embodiment.

FIG. 14 is a flow chart 1400 according to one exemplary embodiment from the perspective of a base station. In step 1405, a configuration for monitoring DCI indicative of a slot format may be transmitted to a UE. In step 1410, a first DCI may not be transmitted in a first monitoring occasion associated with a first slot and a second slot. In step 1415, a second DCI may be transmitted in a second monitoring occasion, wherein the second DCI is indicative of a slot format for the first slot and the second DCI is not indicative of a slot format for the second slot. In step 1420, configured transmission and/or configured reception may be performed based upon the second DCI on one or more first symbols configured as flexible by an RRC configuration, wherein the one or more first symbols are in the first slot. Alternatively and/or additionally, configured transmission and/or configured reception may not be performed on one or more second symbols configured as flexible by the RRC configuration, wherein the one or more second symbols are in the second slot.

Referring back to FIGS. 3 and 4, in one exemplary embodiment of a UE, the device 300 includes a program code 312 stored in the memory 310. The CPU 308 may execute program code 312 (i) to transmit a configuration for monitoring DCI, indicative of a slot format, to a UE, (ii) to not transmit a first DCI in a first monitoring occasion associated with a first slot and a second slot, (iii) to transmit a second DCI in a second monitoring occasion, wherein the second DCI is indicative of a slot format for the first slot and the second DCI is not indicative of a slot format for the second slot, at least one of (iv) to perform, based upon the second DCI, at least one of configured transmission or configured reception on one or more first symbols configured as flexible by an RRC configuration, wherein the one or more first symbols are in the first slot, or (v) to not perform configured transmission and/or configured reception on one or more second symbols configured as flexible by the RRC configuration, wherein the one or more second symbols are in the second slot. Furthermore, the CPU 308 can execute the program code 312 to perform some and/or all of the above-described actions and steps and/or others described herein.

In the context of the embodiment illustrated in FIG. 14 and discussed above, the first monitoring occasion may be a monitoring occasion associated with DCI format 2_0 and/or the second monitoring occasion may be a monitoring occasion associated with DCI format 2_0. Alternatively and/or additionally, the first monitoring occasion may precede (and/or may be before) the second monitoring occasion. Alternatively and/or additionally, the first monitoring occasion and the second monitoring occasion may be separated by a monitoring period (e.g., a monitoring periodicity) associated with DCI format 2_0. Alternatively and/or additionally, the first DCI may be associated with DCI format 2_0 and/or the second DCI may be associated with DCI format 2_0.

It may be appreciated that applying one or more of the techniques presented herein may result in one or more benefits including, but not limited to, an increase in efficiency for determining a slot format associated with a slot and/or performing one or more operations using the slot when (e.g., if and/or responsive to an instance where) a UE does not (successfully) receive and/or detect a group common PDCCH associated with the slot.

A communication device may be provided, wherein the communication device may comprise a control circuit, a processor installed in the control circuit and/or a memory installed in the control circuit and coupled to the processor. The processor may be configured to execute a program code stored in the memory to perform method steps illustrated in FIG. 11, FIG. 12, FIG. 13 and/or FIG. 14. Furthermore, the processor may execute the program code to perform some and/or all of the above-described actions and steps and/or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the disclosed subject matter has been described in connection with various aspects, it will be understood that the disclosed subject matter is capable of further modifications. This application is intended to cover any variations, uses or adaptation of the disclosed subject matter following, in general, the principles of the disclosed subject matter, and including such departures from the present disclosure as come within the known and customary practice within the art to which the disclosed subject matter pertains.

The invention claimed is:

1. A method of a User Equipment (UE), comprising:
receiving a configuration for monitoring downlink control information (DCI) indicative of a slot format, wherein the configuration indicates the UE to monitor a first DCI in a first monitoring occasion associated with a slot and to monitor a second DCI in a second monitoring occasion, wherein the first DCI is indicative of the slot format; and
performing, based upon the second DCI, at least one of configured transmission or configured reception on one or more symbols when:
the first DCI is not received in the first monitoring occasion,
the second DCI is received in the second monitoring occasion, and
the second DCI is indicative of the slot format for the slot, wherein the one or more symbols are configured as flexible by a Radio Resource Control (RRC) configuration and the one or more symbols are in the slot.

2. The method of claim 1, wherein at least one of:
the first monitoring occasion is a monitoring occasion associated with DCI format 2_0; or
the second monitoring occasion is a monitoring occasion associated with DCI format 2_0.

3. The method of claim 1, comprising:
not performing at least one of configured transmission or configured reception on one or more second symbols when:
the first DCI is not received in the first monitoring occasion, and
the second DCI is not received in the second monitoring occasion.

4. The method of claim 1, wherein the first monitoring occasion and the second monitoring occasion are separated by a monitoring period associated with DCI format 2_0.

5. The method of claim 1, wherein at least one of:
the first DCI is associated with DCI format 2_0; or
the second DCI is associated with DCI format 2_0.

6. The method of claim 1, wherein the first DCI is monitored for in the first monitoring occasion.

7. The method of claim 1, wherein the first DCI is not monitored for in the first monitoring occasion when one or more second symbols in the slot are set to at least one of flexible or uplink.

8. The method of claim 1, wherein the second DCI is not received in the second monitoring occasion when there is not a DCI indicative of the slot format in the second monitoring occasion.

9. The method of claim 1, wherein the second DCI is not received in the second monitoring occasion when:
there is a third DCI, indicative of a second slot format for a second slot, in the second monitoring occasion; and
the third DCI is not indicative of the slot format for the slot.

10. The method of claim 1, wherein the UE does not detect a third DCI indicating the UE to perform transmission or reception on the one or more symbols.

11. A method of a User Equipment (UE), comprising:
receiving a configuration for monitoring downlink control information (DCI) indicative of a slot format, wherein the configuration indicates the UE to monitor a first DCI in a first monitoring occasion associated with a first slot and a second slot and to monitor a second DCI in a second monitoring occasion, wherein:
the second DCI is received in the second monitoring occasion;
the second DCI is indicative of a slot format for the first slot; and
the second DCI is not indicative of a slot format for the second slot; and
performing, based upon the second DCI, at least one of configured transmission or configured reception on one or more first symbols in the first slot when the first DCI is not received in the first monitoring occasion, wherein the one or more first symbols in the first slot are configured as flexible by a Radio Resource Control (RRC) configuration.

12. The method of claim 11, wherein at least one of:
the first monitoring occasion is a monitoring occasion associated with DCI format 2_0; or
the second monitoring occasion is a monitoring occasion associated with DCI format 2_0.

13. The method of claim 11, comprising:
not performing at least one of configured transmission or configured reception on one or more second symbols in the second slot when the first DCI is not received in the first monitoring occasion, wherein the one or more second symbols in the second slot are configured as flexible by the Radio Resource Control (RRC) configuration.

14. The method of claim 11, wherein the first monitoring occasion and the second monitoring occasion are separated by a monitoring period associated with DCI format 2_0.

15. The method of claim 11, wherein at least one of:
the first DCI is associated with DCI format 2_0; or
the second DCI is associated with DCI format 2_0.

16. A method of a base station, comprising:
transmitting, to a User Equipment (UE), a configuration for monitoring downlink control information (DCI) indicative of a slot format;
not transmitting a first DCI in a first monitoring occasion associated with a first slot and a second slot;
transmitting a second DCI in a second monitoring occasion, wherein:
the second DCI is indicative of a slot format for the first slot; and
the second DCI is not indicative of a slot format for the second slot; and
performing, based upon the second DCI, at least one of configured transmission to the UE or configured reception from the UE on one or more first symbols configured as flexible by a Radio Resource Control (RRC) configuration, wherein the one or more first symbols are in the first slot.

17. The method of claim 16, wherein at least one of:
the first monitoring occasion is a monitoring occasion associated with DCI format 2_0; or
the second monitoring occasion is a monitoring occasion associated with DCI format 2_0.

18. The method of claim 16, comprising:
not performing at least one of configured transmission to the UE or configured reception from the UE on one or more second symbols configured as flexible by the RRC configuration, wherein the one or more second symbols are in the second slot.

19. The method of claim 16, wherein the first monitoring occasion and the second monitoring occasion are separated by a monitoring period associated with DCI format 2_0.

20. The method of claim 16, wherein at least one of:
the first DCI is associated with DCI format 2_0; or
the second DCI is associated with DCI format 2_0.

* * * * *